(12) United States Patent
Stan et al.

(10) Patent No.: US 9,535,085 B2
(45) Date of Patent: Jan. 3, 2017

(54) INTERMITTENT CONTACT RESONANCE ATOMIC FORCE MICROSCOPE AND PROCESS FOR INTERMITTENT CONTACT RESONANCE ATOMIC FORCE MICROSCOPY

(71) Applicants: NATIONAL INSTITUTE OF STANDARDS AND TECHNOLOGY, Gaithersburg, MD (US); Gheorghe Stan, Gaithersburg, MD (US)

(72) Inventors: Gheorghe Stan, Gaithersburg, MD (US); Richard S. Gates, Gaithersburg, MD (US)

(73) Assignees: THE UNITED STATES OF AMERICA, AS REPRESENTED BY THE SECRETARY OF COMMERCE, Washington, DC (US); UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 14/816,438

(22) Filed: Aug. 3, 2015

(65) Prior Publication Data
US 2015/0338437 A1     Nov. 26, 2015

Related U.S. Application Data

(60) Provisional application No. 62/033,475, filed on Aug. 5, 2014.

(51) Int. Cl.
*G01Q 10/00* (2010.01)
*G01Q 60/34* (2010.01)

(52) U.S. Cl.
CPC .............. *G01Q 10/00* (2013.01); *G01Q 60/34* (2013.01)

(58) Field of Classification Search
CPC ........ G01Q 10/00; G01Q 10/02; G01Q 10/04; G01Q 10/045; G01Q 10/06; G01Q 10/065
(Continued)

(56) References Cited

U.S. PATENT DOCUMENTS 6,094,972 A * 8/2000 Yasutake ................ B82Y 35/00
73/105
8,590,061 B1 * 11/2013 Zou ........................ B82Y 35/00
850/1

(Continued)

*Primary Examiner* — Jason McCormack
(74) *Attorney, Agent, or Firm* — Toby D. Hain

(57) ABSTRACT

An intermittent contact atomic force microscope includes: a cantilever configured to receive a contact resonance modulation; a sample disposed proximate to the cantilever; a contact resonance modulator in communication with the cantilever and configured to provide the contact resonance modulation to the cantilever; and a scan modulator in mechanical communication with the sample to provide a scan modulation to the sample. Also disclosed is a process for performing intermittent contact atomic force microscopy, the process includes: providing a dual modulation microscope including: a cantilever configured to receive a contact resonance modulation; a sample disposed proximate to the cantilever; a contact resonance modulator in communication with the cantilever and configured to provide the contact resonance modulation to the cantilever; and a scan modulator in mechanical communication with the sample to provide a scan modulation to the sample; subjecting the cantilever to the contact resonance modulation; modulating the cantilever at a contact resonance frequency; subjecting the sample to the scan modulation; and modulating the sample at a scan modulation frequency to perform intermittent contact atomic force microscopy.

21 Claims, 21 Drawing Sheets

(58) Field of Classification Search
USPC .................................. 850/1, 2, 3, 4, 5, 7, 18
See application file for complete search history.

(56) References Cited

U.S. PATENT DOCUMENTS

| | | | |
|---|---|---|---|
| 2004/0089059 A1* | 5/2004 | Watanabe | B82Y 35/00 73/105 |
| 2008/0276695 A1* | 11/2008 | Prater | B82Y 35/00 73/105 |
| 2009/0133168 A1* | 5/2009 | Ando | B82Y 35/00 850/33 |
| 2010/0011471 A1* | 1/2010 | Jesse | G01Q 10/06 850/21 |
| 2011/0138506 A1* | 6/2011 | Humphris | B82Y 35/00 850/6 |
| 2011/0231965 A1* | 9/2011 | Passian | B82Y 35/00 850/6 |
| 2011/0289635 A1* | 11/2011 | Burns | G01Q 10/065 850/1 |
| 2013/0117895 A1* | 5/2013 | Proksch | G01Q 10/00 850/1 |

* cited by examiner

Stiffness maps

Surface topography

Separation

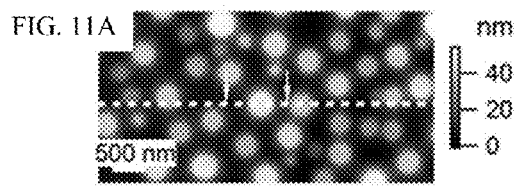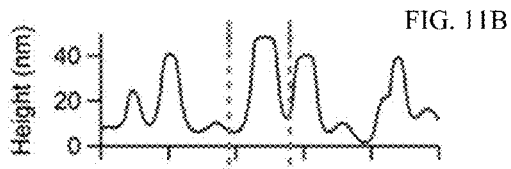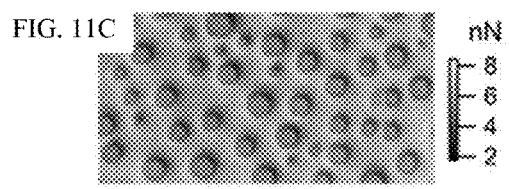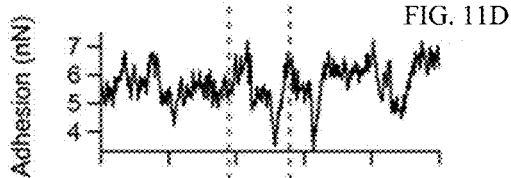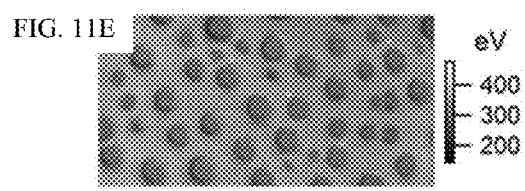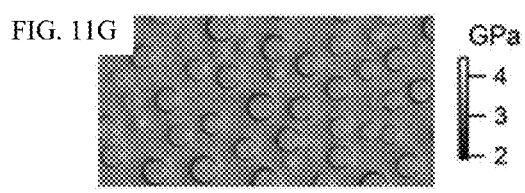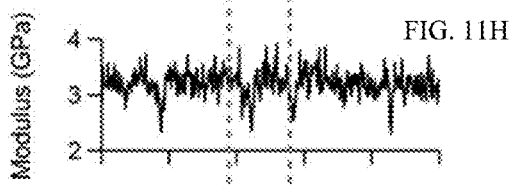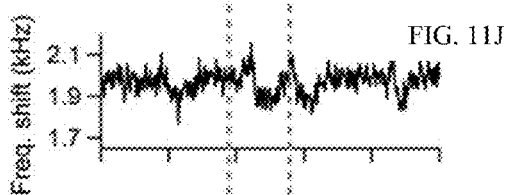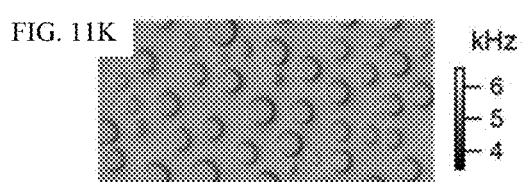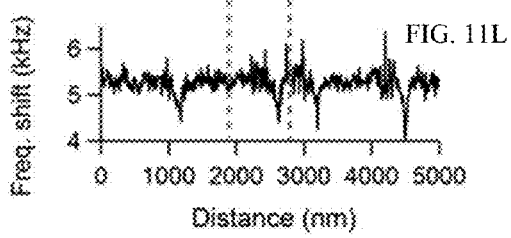

FIG. 22A  F = 0 nN
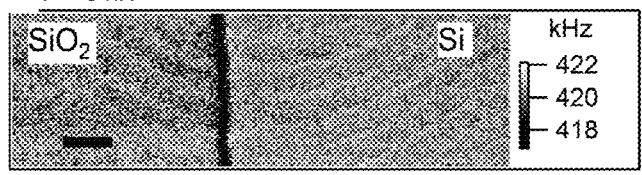
FIG. 22B
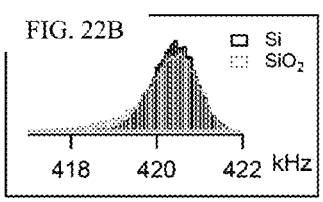
FIG. 22C  F = 50 nN
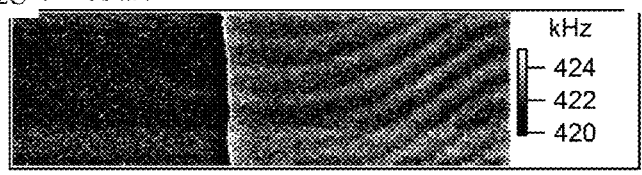
FIG. 22D
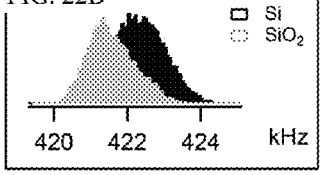
FIG. 22E  F = 100 nN
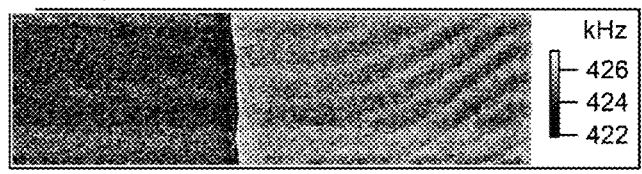
FIG. 22F
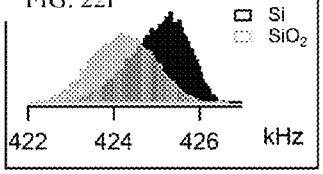
FIG. 22G  F = 150 nN
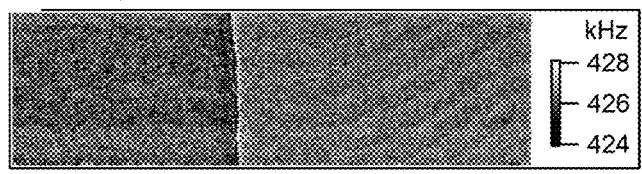
FIG. 22H
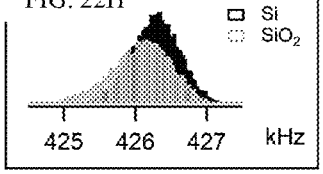
FIG. 22I  F = 200 nN
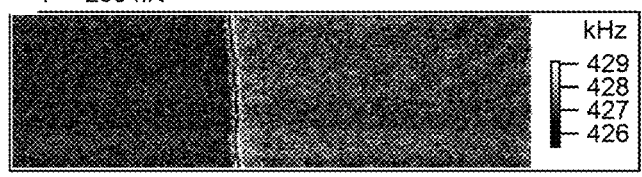
FIG. 22J
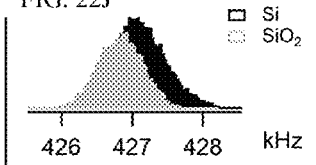
FIG. 22K  F = 250 nN
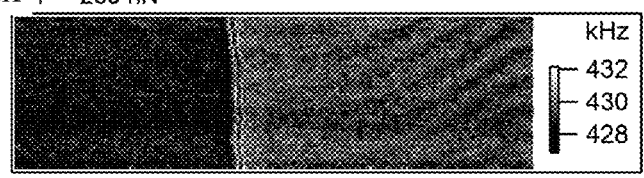
FIG. 22L
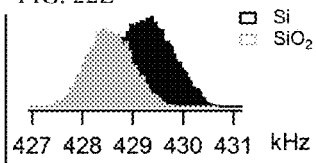

2 µm x 2 µm 200 nm

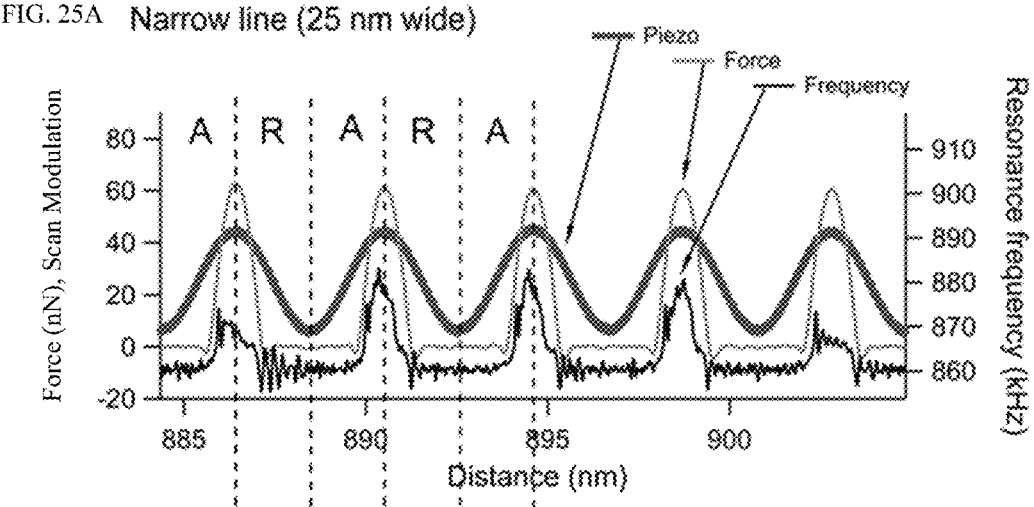
FIG. 25A Narrow line (25 nm wide)
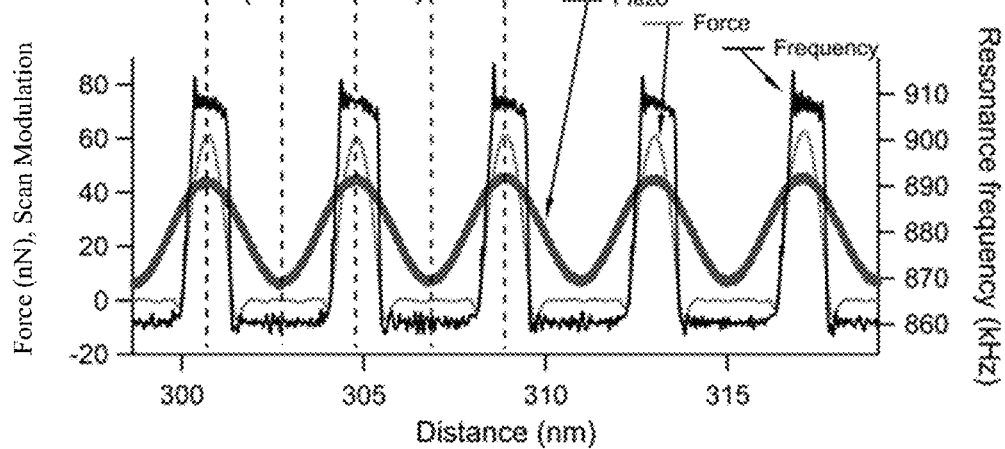
FIG. 25B Wide line (90 nm wide)

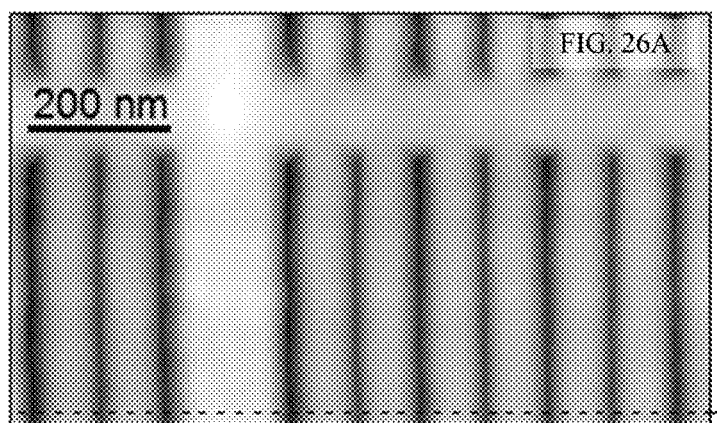
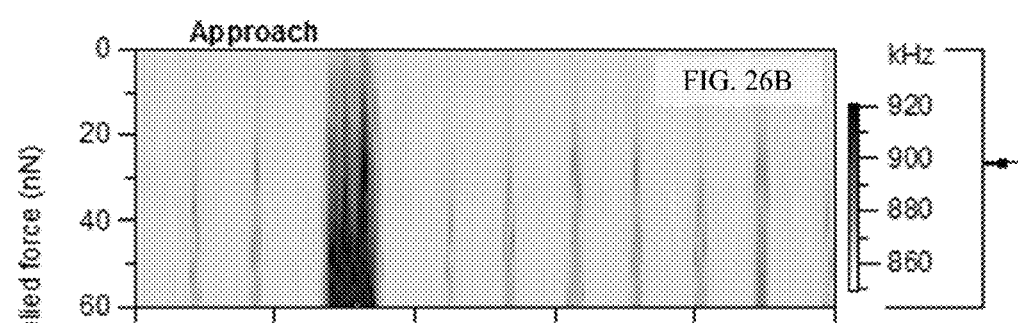
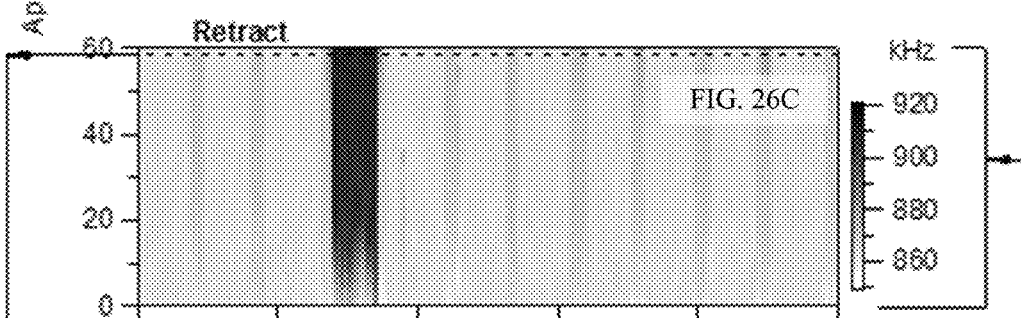
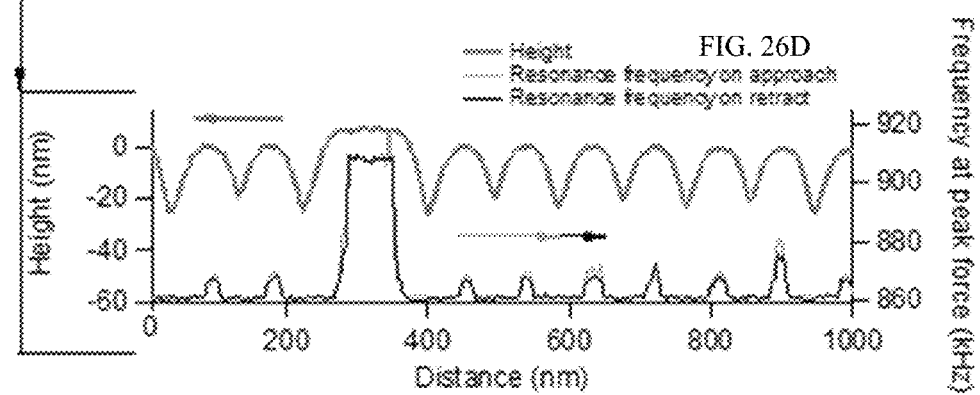

INTERMITTENT CONTACT RESONANCE ATOMIC FORCE MICROSCOPE AND PROCESS FOR INTERMITTENT CONTACT RESONANCE ATOMIC FORCE MICROSCOPY

CROSS REFERENCE TO RELATED APPLICATIONS

This application claims the benefit of U.S. Provisional Patent Application Ser. No. 62/033,475 filed Aug. 5, 2014, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BRIEF DESCRIPTION

Disclosed is an intermittent contact resonance atomic force microscope comprising: a cantilever configured to receive a contact resonance modulation; a sample disposed proximate to the cantilever; a contact resonance modulator in communication with the cantilever and configured to provide the contact resonance modulation to the cantilever; and a scan modulator in mechanical communication with the sample to provide a scan modulation to the sample.

Also disclosed is a process for performing intermittent contact resonance atomic force microscopy, the process comprising: providing an intermittent contact resonance atomic force microscope comprising: a cantilever configured to receive a contact resonance modulation; a sample disposed proximate to the cantilever; a contact resonance modulator in communication with the cantilever and configured to provide the contact resonance modulation to the cantilever; and a scan modulator in mechanical communication with the sample to provide a scan modulation to the sample; subjecting the cantilever to the contact resonance modulation; modulating the cantilever at a contact resonance frequency; subjecting the sample to the scan modulation; and modulating the sample at a scan modulation frequency to perform intermittent contact resonance atomic force microscopy.

BRIEF DESCRIPTION OF THE DRAWINGS

The following descriptions should not be considered limiting in any way. With reference to the accompanying drawings, like elements are numbered alike.

FIG. 11A shows a map of topography of the sample shown in FIG. 10;

FIG. 11B shows a graph of height versus distance for the map shown in FIG. 11A;

FIG. 11C shows a map of adhesion of the sample shown in FIG. 10;

FIG. 11D shows a graph of adhesion versus distance for the map shown in FIG. 11C;

FIG. 11E shows a map of dissipation of the sample shown in FIG. 10;

FIG. 11F shows a graph of dissipation versus distance for the map shown in FIG. 11E;

FIG. 11G shows a map of modulus of the sample shown in FIG. 10;

FIG. 11H shows a graph of modulus versus distance for the map shown in FIG. 11G;

FIG. 11I shows a map of frequency shift for the sample shown in FIG. 10;

FIG. 11J shows a graph of frequency shift versus distance for the map shown in FIG. 11I;

FIG. 11K shows a graph of frequency shift for the sample shown in FIG. 10;

FIG. 11L shows a graph of frequency shift versus distance for the map shown in FIG. 11K;

FIGS. 22A, 22C, 22E, 22F, 22G, 22I, and 22K show a map of resonance frequency for the sample shown in FIG. 15A at a plurality of applied forces;

FIGS. 22B, 22D, 22F, 22H, 22J, and 22L show a histogram for the plurality of applied forces of respective maps shown in FIGS. 22A, 22C, 22E, 22F, 22G, 22I, and 22K;

FIG. 25A shows a graph of force, scan modulation, and resonance frequency versus distance for the sample according to Example 3;

FIG. 25B shows a graph of force, scan modulation, and resonance frequency versus distance for the sample according to Example 3;

FIG. 26A shows a two-dimensional topographic view of the sample according to Example 3;

FIG. 26B shows a graph of contact resonance frequency versus applied force and distance during approach of a cantilever to the sample according to Example 3;

FIG. 26C shows a graph of contact resonance frequency versus applied force and distance during retraction of a cantilever to the sample according to Example 3;

FIG. 26D shows a graph of height and frequency versus distance during the approach and retraction of a cantilever to the sample according to Example 3.

DETAILED DESCRIPTION

A detailed description of one or more embodiments is presented herein by way of exemplification and not limitation.

It has been discovered that an intermittent contact resonance atomic force microscope (ICR-AFM) herein provides determination of a mechanical property as well as one-dimensional and multidimensional properties of a sample on a nanometer scale that acquires data for such properties at an imaging speed and with a sensitivity for depth sensing. Moreover, the intermittent contact resonance atomic force microscope provides an imaging mode for atomic force microscopy that includes high-speed frequency modulation performed in a scanning force controlled mode. Further, the intermittent contact resonance atomic force microscope is configured to track a change in a contact resonance frequency of an eigenmode of an atomic force microscope (AFM) cantilever during scanning as the cantilever intermittently contacts a sample at a selected applied maximum force, which is referred to as a setpoint. Additionally, the intermittent contact resonance atomic force microscope acquires data as the cantilever is subjected to a contact resonance modulation at a contact resonance frequency that is at a frequency of an eigenmode of the cantilever. The data provides quantitative nanomechanical properties of the sample as a function of depth at each oscillation cycle (also referred to as a "tap") between the cantilever and the sample. The nanomechanical properties are used to develop nanotechnology that includes, e.g., advanced materials, microelectromechanical systems (MEMS), nano-electromechanical systems (NEMS, e.g., molecular scale electronics such as a molecular logic gate or molecular wire), microfabrication process, nanofabrication process, and the like.

Figure 1:
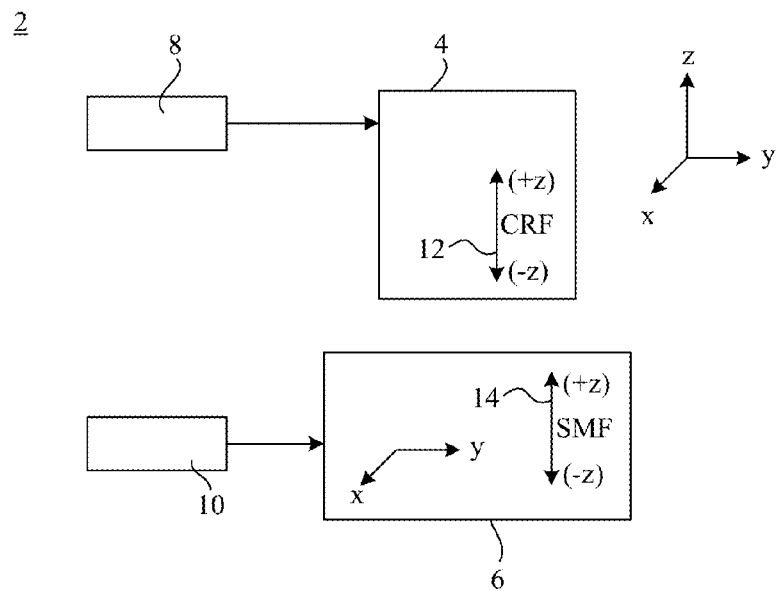
FIG. 1 show an intermittent contact resonance atomic force microscope (ICR-AFM)

In an embodiment, as shown in FIG. 1, intermittent contact resonance atomic force microscope 2 includes cantilever 4 disposed proximate to sample 6. Contact resonance modulator 8 is in communication with cantilever 4, and scan modulator 10 is in communication with sample 6. Here, cantilever 4 is configured to receive a contact resonance modulation 12 from contact resonance modulator 8. Additionally, scan modulator 10 provides a scan modulation 14 to sample 6. Accordingly, cantilever 4 and sample 6 are configured to be subjected independently to vibrational modulation along a z-direction (e.g., among a (+z)-direction or (−z)-direction) in a coordinate system shown in FIG. 1 at respective contact resonance modulation 12 and scan modulation 14. Moreover, sample 6 is configured to be subjected to displacement in an x-direction or y-direction with respect to the coordinate system. In some embodiments, sample 6 is moved in the x-y plane with respect to a position of tip 42 being held constant. In other embodiments, tip 42 is moved with respect to a position of sample 6 being held constant. It is contemplated that tip 42 and sample 6 are independently moved with respect to each in certain embodiments.

Figure 2:
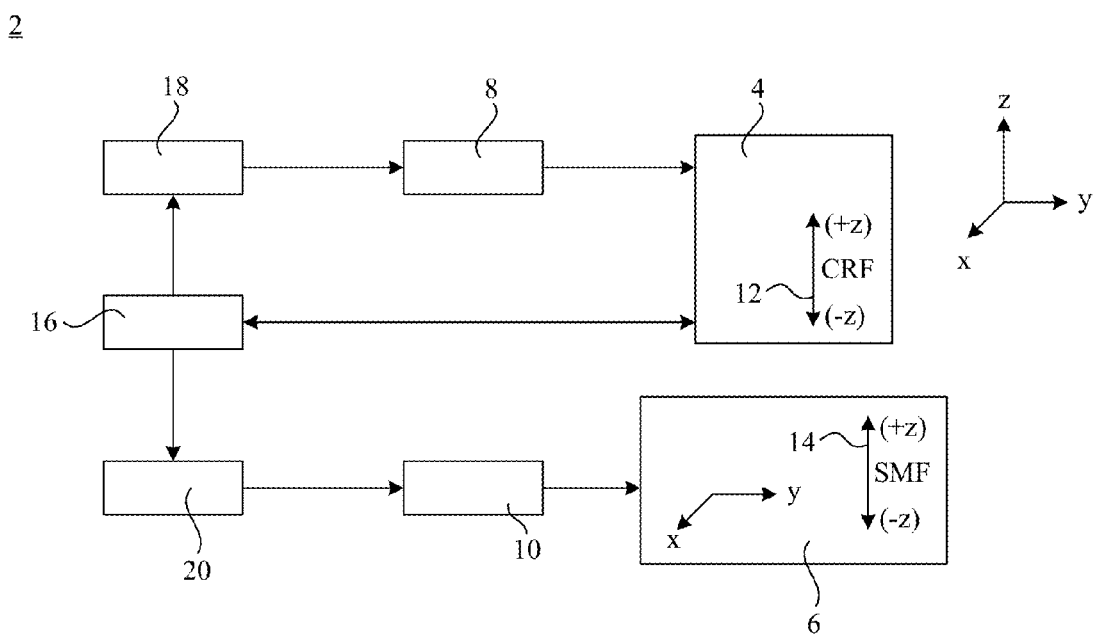
FIG. 2 shows an intermittent contact resonance atomic force microscope.

According to an embodiment, as shown in FIG. 2, intermittent contact resonance atomic force microscope 2 includes cantilever controller 18, sample controller 20, and detector 16. Cantilever controller 18 is in communication with contact resonance modulator 8 to provide a contact resonance control signal to contact resonance modulator 8. Similarly, sample controller 20 is in communication with scan modulator 10 to provide a scan modulation control signal to scan modulator 10. Detector 16 is configured to detect a deflection of cantilever 4, which deflects in response to modulation provided by contact resonance modulator 8. Detector 16 is further configured to provide an electrical signal (e.g., a waveform referred to as feedback frequency 45 (e.g., see FIG. 5a)) that includes amplitude, frequency, and time information about the deflection of cantilever 4 to cantilever controller 18 and sample controller 20.

Figure 3:
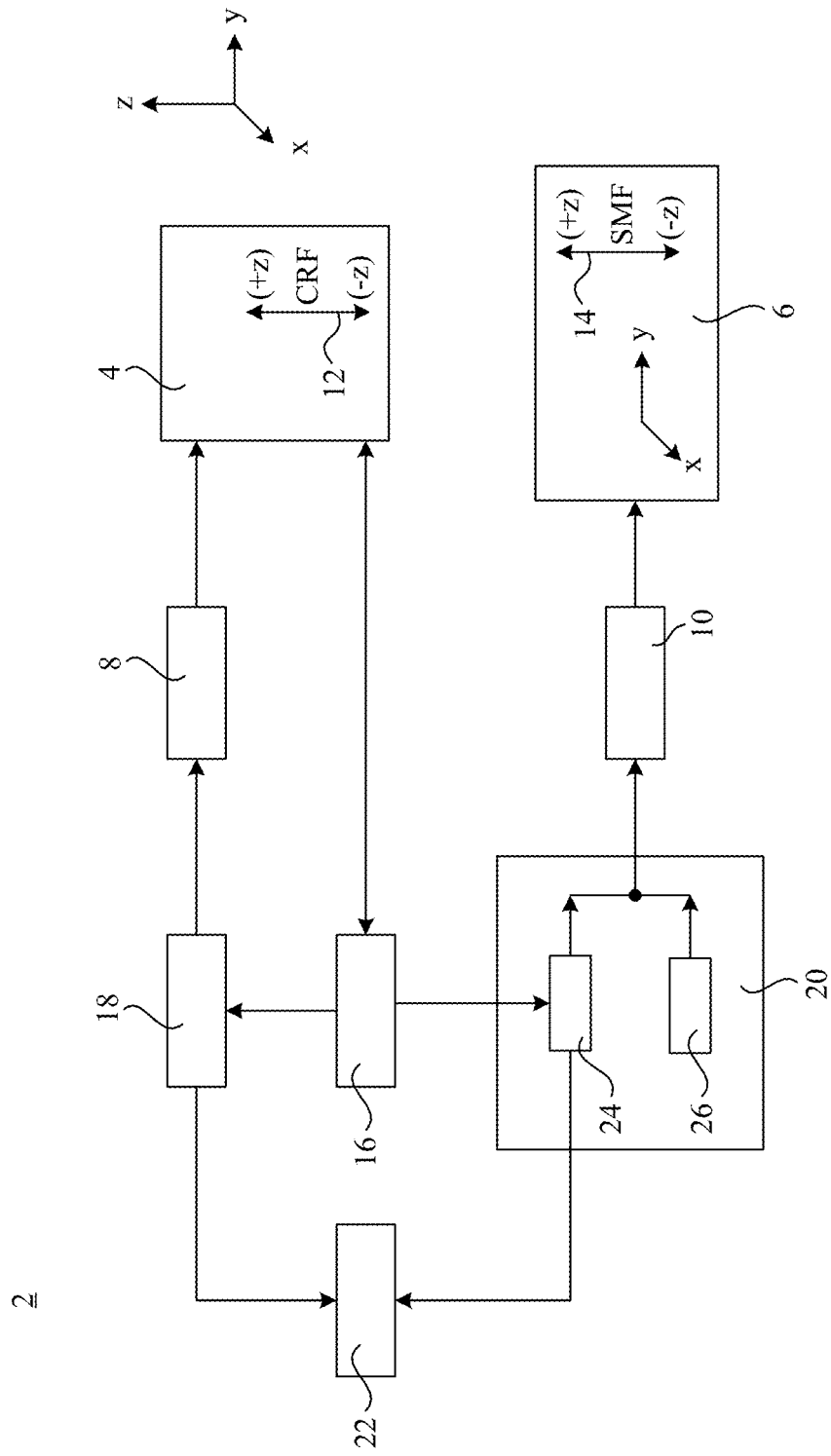
FIG. 3 shows an intermittent contact resonance atomic force microscope.

In an embodiment, as shown in FIG. 3, intermittent contact resonance atomic force microscope 2 includes signal processor 22 in communication with cantilever controller 18 and sample controller 20. Signal processor 22 is configured to receive data from cantilever controller 18 and sample controller 20. Such data includes an operational parameter of intermittent contact resonance atomic force microscope 2, e.g., force applied between cantilever 4 and sample 6, frequency (e.g., contact resonance frequency CRF corresponding to contact resonance modulation 12, scan modulation frequency SMF corresponding to scan modulation 14, and the like), time, amplitude, displacement (e.g., of sample 6 or cantilever 4), and correlations therebetween such as force versus time, displacement versus time, frequency versus time, amplitude versus time, force versus position, position versus time, and the like. Here, sample controller 20 includes first controller 24 and second controller 26. First controller 24 (e.g., a proportional integral (PI) controller) is configured to receive detector signal from detector 16, to provide a setpoint, and to communicate the setpoint, x-position control data, y-position control data, and z-position control data to scan modulator 10. In this configuration, first controller 24 provides the setpoint in a control loop to select a nominal value of an applied force between cantilever 4 and sample 6. Second controller 26 is configured to provide scan modulation frequency SMF to scan modulator 10. That is, second controller 26 provides scan modulation 14 to modulate the z-position control data provided by first controller 24. It is contemplated that sample 6 is disposed on a mechanical platform to provide x-direction, y-direction, and z-direction motion (not shown) to sample 6 in relation to the position of cantilever 4, wherein the mechanical platform receives position control data from sample controller 20 directly or via scan modulator 10.

In intermittent contact resonance atomic force microscope 2, cantilever 4 can be any cantilever configured to be modulated at contact resonance frequency CRF. Exemplary cantilevers 4 include an electrically conductive cantilever, an electrically insulating cantilever, a magnetic cantilever, a polymer cantilever, a metal cantilever, a composite cantilever, and the like. Cantilever 4 can include a projection such as tip 44 (e.g., see FIG. 5A) proximate to sample 6, an aperture, and the like. Tip 44 can be a same or different material as body 44 (e.g., see FIG. 5A) of cantilever 4. In a particular embodiment, cantilever 4 includes silicon. Cantilever 4 also can be made of a hard material such as ceramic (e.g., silicon nitride) or a durable material such as monolithic or coated diamond. Also, a geometry of cantilever tip 42 can be modified for different applications by controlling a radius or shape of tip 42 (e.g., spherical, flat punch, conical) through a procedure to form or modify a tip 42 geometry such as mechanical, chemical, tribochemical, focus ion beam processing, and the like.

Sample 6 can be any material that can be subjected to intermittent contact resonance atomic force microscopy herein. Sample 6 can have a stiffness or other material property to be determined via intermittent contact resonance atomic force microscopy in combination with cantilever 4 disposed in intermittent contact resonance atomic force microscope 2.

Figure 4A:
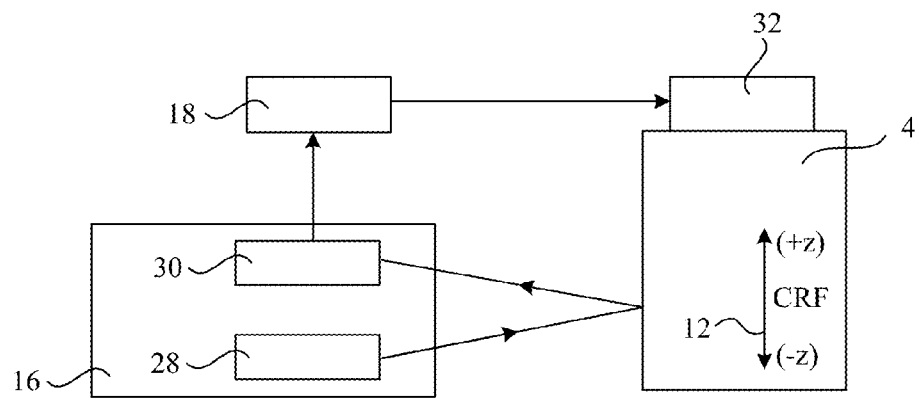
FIG. 4A, FIG. 4B, and FIG. 4C show a cantilever, contact resonance modulator, and detector.
Figure 4B:
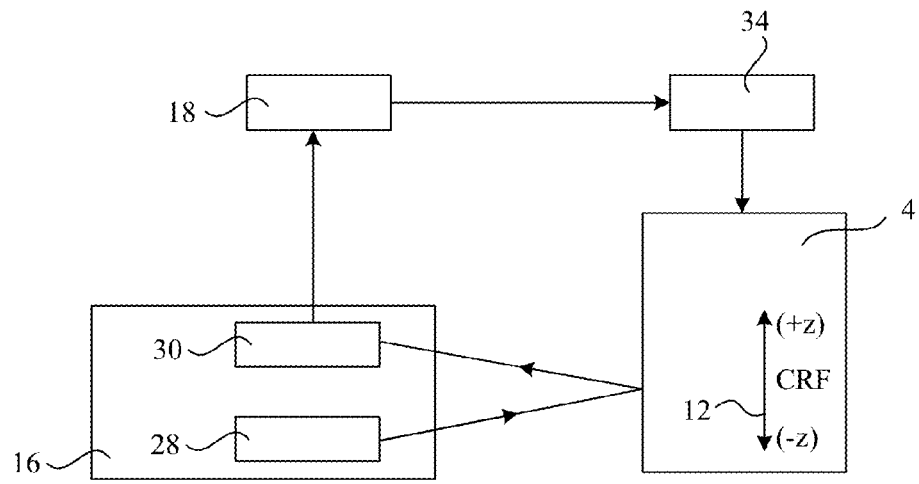
Figure 4C:
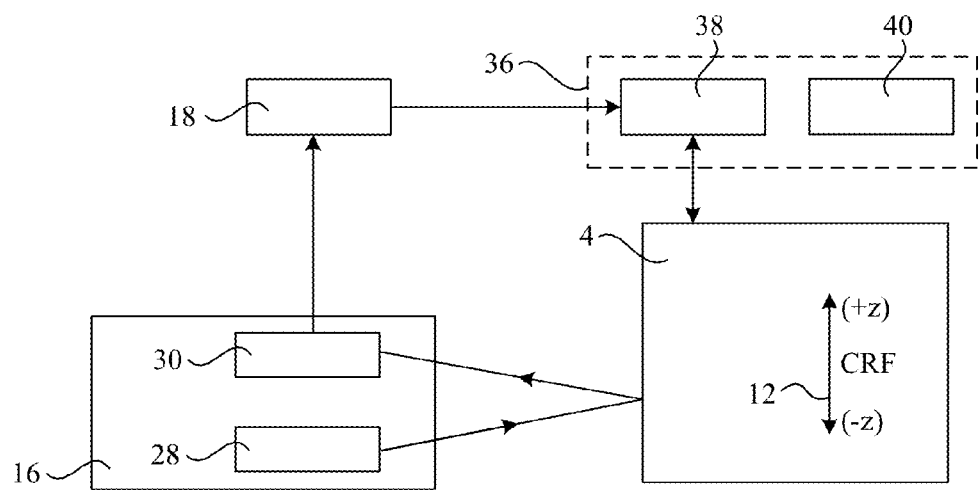

With reference to FIGS. 4A, 4B, 4C, contact resonance modulator 8 can be in electrical communication, optical communication, mechanical communication, or magnetic communication with cantilever 4. In an embodiment, contact resonance modulator 8 is mechanical transducer 32 that is in mechanical communication with cantilever 4. Mechanical transducer 32 is configured to modulate mechanically cantilever 4 at contact resonance frequency CRF. Exemplary mechanical transducers 32 include a piezoelectric transducer and the like.

In some embodiments, as shown in FIG. 4B, contact resonance modulator 8 is optical transducer 34 that is in optical communication with cantilever 4. Optical transducer 34 is configured to provide radiation (e.g., a selected wavelength of light such as visible, ultraviolet, infrared, and the like) to cantilever 4 at contact resonance frequency CRF, wherein the radiation thermally subjects cantilever 4 to contact resonance modulation relative to sample 6. Exemplary optical transducers 34 include a laser, flash lamp, and the like and can include free-space propagation of radiation or propagation of radiation through, e.g. an optical fiber.

According to an embodiment, as shown in FIG. 4C, contact resonance modulator 8 is magnetic transducer 36 that is in magnetic communication with cantilever 4. Magnetic transducer 36 is configured to provide a magnetic field having a selected magnetic field strength that has a magnitude sufficient to modulate cantilever 4 at contact resonance frequency CRF. Here, magnetic transducer 36 includes current source 38 and magnet 40. Current source 38 communicates electrical current to and from cantilever 4 such that cantilever 4 produces a localized magnetic field in combination with magnet 40. Accordingly, current source 38 can provide the electrical current in a waveform corresponding to contact resonance frequency CRF such that cantilever 4 is subjected to contact resonance modulation 12 through the localized magnetic field.

As shown in FIGS. 4A, 4B, and 4C, it is contemplated that, in an embodiment, detector 16 includes laser 28 and photodetector 30. Laser 28 provides a laser beam that reflects from cantilever 4 such that the laser beam reflected from cantilever 4 is received by photodetector 30. In this manner, contact resonance modulation 12 and deflection of cantilever 4 is detected by detector 16. Feedback frequency 45 is produced by photodetector 30 and provided to, e.g., cantilever controller 18, controller 20, single processor 22, and the like.

In an embodiment, intermittent contact resonance atomic force microscope 2 includes cantilever controller 18 in communication with contact resonance modulator 8. Cantilever controller 18 can be, e.g., a phase sensitive detector configured to provide a lock frequency (e.g., contact resonance frequency CRF) to the contact resonance modulator 8. An exemplary phase sensitive detector includes a phase-locked loop (PLL) detector, wherein a frequency detected by cantilever control 18 is feedback frequency 45 from photodetector 30 of detector 16. Cantilever controller 18 provides a fast response to phase lock the lock frequency and feedback frequency 45 from photodetector 30 and to produce an output for single processor 22. Further, a response speed of cantilever controller 18 is less than or equal to 1 milliseconds (ms), specifically less than or equal to 1 microseconds (μs), and more specifically greater than or equal 1 μs to less than tens of μs. Accordingly, intermittent contact resonance atomic force microscope 2 is configured to modulate cantilever 4 at contact resonance frequency CRF and modulate sample 6 at scan modulation frequency SMF while intermittently subjecting a force to sample 6 from cantilever 4 to obtain imaging data for determination of materials properties (e.g., modulus, stiffness, and the like) for a surface and sub-surface portion of sample 6.

Dual modulation microscope 2 includes scan modulator 10 in communication with sample 6. Scan modulator 10 can be, e.g., a piezoelectric article to provide AC-direction modulation to sample 6 and can be disposed on a platform that provides x-direction and y-direction motion to sample 6.

Figure 5A:
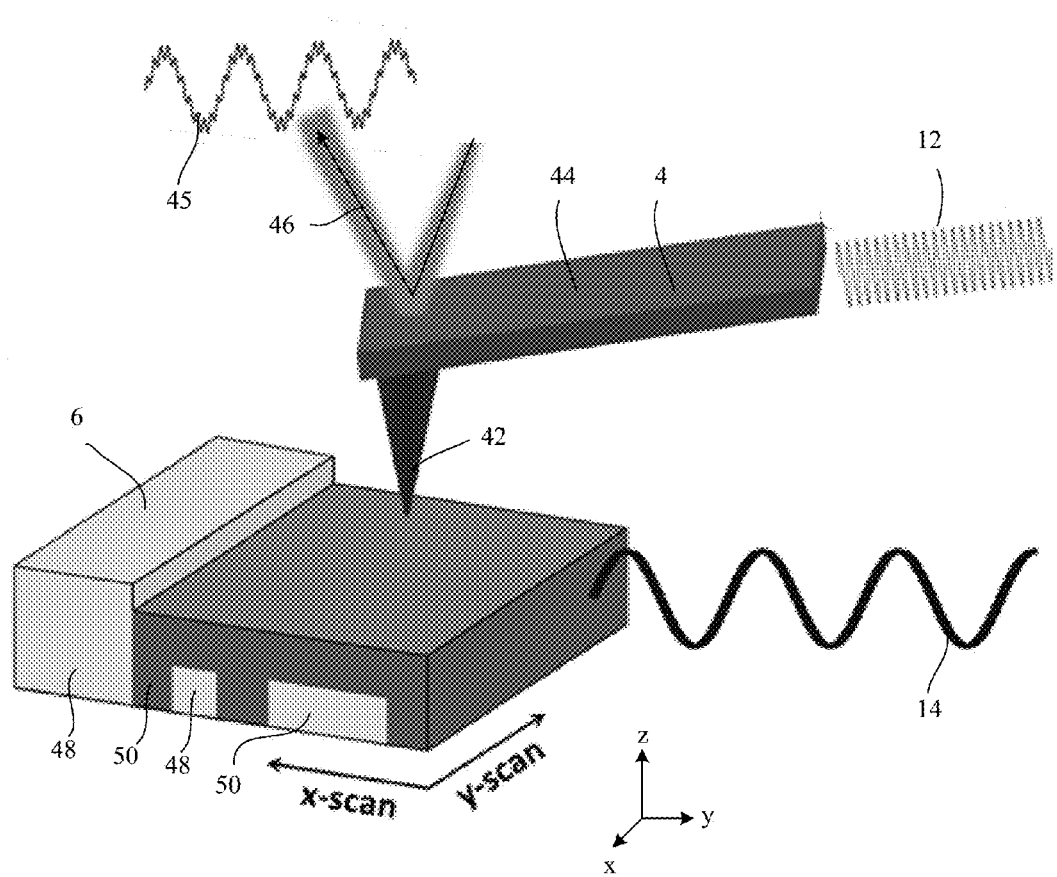
FIG. 5A shows a perspective view of an intermittent contact resonance atomic force microscope.
Figure 5B:
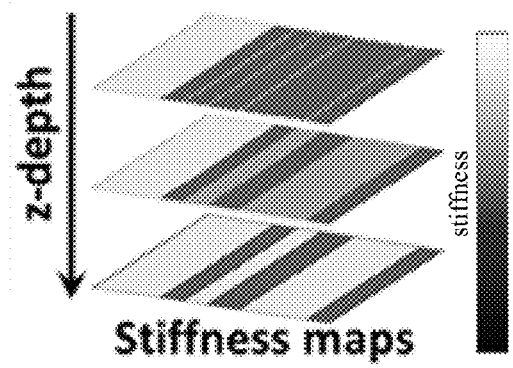
FIG. 5B shows a plurality of stiffness maps of the sample shown in FIG. 5A.
Figure 5C:
FIG. 5C shows a surface topography of the sample shown in FIG. 5A.

FIG. 5A shows a perspective view of intermittent contact resonance atomic force microscope 2 wherein cantilever 4 includes cantilever tip 42 disposed on cantilever body 44 in proximate to sample 6. Cantilever 4 is subjected to modulation by contact resonance modulation 12 at contact resonance frequency CRF and also subjected to laser beam 46 for detection of deflection of cantilever 4. Sample 6 can be subjected to displacement in the x-direction or y-direction and also subjected to modulation in the z-direction by scan modulation 14 at scan modulation frequency SMF. Here, scan modulation 14 is independent of contact resonance modulation 12 such that contact resonance frequency CRF is independent of scan modulation frequency SMF. It should be appreciated that laser beam 46 reflected from cantilever 4 therefore includes feedback frequency 45 having an amplitude, frequency, and time information that includes a combination of contact resonance modulation 12, scan modulation 14, or a perturbation of contact resonance modulation 12 and scan modulation 14 due to interaction of cantilever tip 42 with sample 6. Here, sample 6 can include a plurality of stiffnesses, e.g. first stiffness 48 and second stiffness 50 such as first stiffness 48 from a first material and second stiffness 50 from a second material. Accordingly, data obtained from intermittent contact resonance atomic force microscope 2 can be analyzed to produce, e.g., a map of stiffness of sample 6 as shown in FIG. 5B, a surface topography of sample 6 as shown in FIG. 5C, and the like.

In an embodiment, a process for making intermittent contact resonance atomic force microscope 2 includes disposing cantilever 4 proximate to sample 6; providing contact resonance modulator 8 in communication with cantilever 4; providing a scan modulator 10 in communication with sample 6; providing cantilever controller 18 in communication with contact resonance modulator 8; providing sample controller 20 in communication with scan modulator 10; providing detector 16 in communication with cantilever controller 18 and sample controller 20 and also in optical communication with cantilever 4; and providing signal processor 22 in communication with cantilever controller 18 and sample controller 20.

According to an embodiment, intermittent contact resonance atomic force microscope 2 is configured to perform dual modulation microscopy on sample 6. A process for performing intermittent contact resonance atomic force microscopy includes: providing ICR-AFM 2 that includes: cantilever 4 configured to receive contact resonance modulation 12; sample 6 disposed proximate to cantilever 4; contact resonance modulator 8 in communication with cantilever 4 and configured to provide contact resonance modulation 12 to cantilever 4; and scan modulator 10 in mechanical communication with sample 6 to provide scan modulation 14 to sample 6; subjecting cantilever 4 to contact resonance modulation 12; modulating cantilever 4 at contact resonance frequency CRF; subjecting sample 6 to scan modulation 14; and modulating sample 6 at scan modulation frequency SMF to perform dual modulation microscopy.

The process further includes detecting a deflection of cantilever 4; and producing feedback frequency 45 based on the deflection of cantilever 4. The process can also include receiving, by phase sensitive detector (e.g., included in cantilever controller 18), feedback frequency 45; and providing a lock frequency to contact resonance modulator 8 from the phase sensitive detector 45, wherein the deflection of cantilever 4 is phase locked to the lock frequency. In some embodiments, the process includes receiving, by sample controller 20, feedback frequency 45; and producing, by sample controller 20, scan modulation frequency SMF; and providing scan modulation frequency SMF to scan modulator 10 from sample controller 20.

With reference again to FIGS. 3 and 5A, cantilever 4 is subjected to contact resonance modulation 12 from contact resonance modulator 8, and sample 6 is subjected to scan modulation 14 from scan modulator such that two modulations (i.e., contact resonance modulation 12 and scan modulation 14) are applied to tip 42—sample 6 contact through separated and independent modulators (8, 10) at independent frequencies (i.e., contact resonance frequency CRF and scan modulation frequency SMF) to reduce crosstalk. In an embodiment, a frequency of contact resonance frequency CRF is greater than a frequency of scan modulation frequency SMF. Further, while contact resonance frequency CRF is at a frequency of an eigenmode of cantilever 4, scan modulation frequency SMF is at a non-eigenmode frequency of cantilever 4. According to an embodiment, contact resonance frequency CRF is at a higher eigenmode (cf. fundamental frequency) of cantilever 4.

Figure 6:
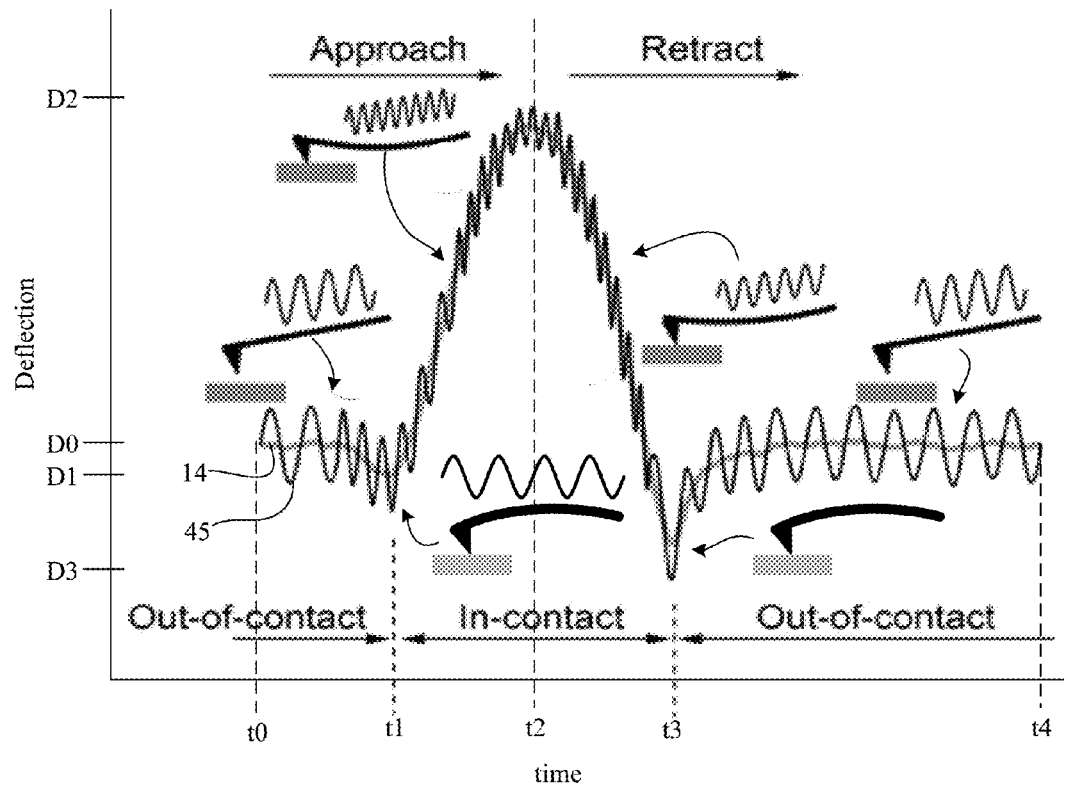
FIG. 6 shows a graph of deflection and resonance frequency change versus time for a plurality of cantilever and sample relative positions.

FIG. 6 shows a graph of deflection D of cantilever 4 versus time for an oscillation of sample 6 at scan modulation frequency SMF and a plurality of oscillations of cantilever 4 at contact resonance frequency CRF. Here one period of interaction between cantilever 4 and sample 6 is shown with tip 42 of cantilever 4 in contact with sample 6 at time t1 through time t2 and out-of-contact with sample 6 at time t0 and time t4. More specifically, at time t0, cantilever 4 modulates at resonance frequency CRF in free oscillation due to substantially no interaction with sample 6 such that cantilever 4 and sample 6 are out-of-contact, and cantilever 4 has deflection D0, which is non-deflection of cantilever 4 by sample 6 although cantilever 4 is subject to contact resonance modulation 12. Between time t0 and time t1, cantilever 4 and sample 6 approach one another, and cantilever 4 deflects toward sample 6 at time t1. Moreover, contact resonance frequency CRF decreases from first frequency f1 at time t0 to second frequency f2 at time t1. At the time t1, cantilever 4 is subjected to an attractive force with sample 6, deflects toward sample 6, and attains deflection D1, and contact resonance frequency CRF decreases from first frequency f1 to second frequency f2.

Between time t1 and time t2, cantilever 4 and sample 6 further approach one another, and cantilever 4 deflects away from sample 6 at time t2. Moreover, contact resonance frequency CRF increases from second frequency f2 at time t1 to third frequency f3 at time t2. At the time t2, cantilever 4 is subjected to a repulsive force with sample 6, deflects away from sample 6, and attains deflection D2, and contact resonance frequency CRF increases from second frequency f2 to third frequency f3.

Between time t2 and time t3, cantilever 4 and sample 6 retract from one another, and cantilever 4 deflects from displacement D2 at time t2 to displacement D3 at time t3. Displacement D2 is a maximum deflection of cantilever 4 away from sample 6, and displacement D3 is a maximum deflection of cantilever 4 toward sample 6. Further, cantilever 4 transitions from displacement D2 to displacement D3 via displacement D0 at some time between time t2 and time t3. Accordingly, contact resonance frequency CRF is a greatest frequency (third frequency f3) at time t2 and least frequency (fourth frequency f4) at time t3, and contact resonance frequency CRF transitions from the third frequency f2 to fourth frequency f4 via first frequency f1 as cantilever 4 passes through displacement D0 at some time between time t2 and time t3.

Between time t3 and time t4, cantilever 4 and sample 6 continue to retract from one another, and cantilever 4 deflects from displacement D3 at time t3 to displacement D0 at time t4. While displacement D3 is a maximum deflection of cantilever 4 toward sample 6, displacement D0 occurs as cantilever 4 and sample 6 substantially did not interact such that cantilever 4 and sample 6 are out-of-contact at time t4, and contact resonance frequency CRF increases from fourth frequency f4 to first frequency f1.

After acquisition of data for the period shown in FIG. 6, the process can be repeated at a same x-y position on sample 6, or sample 6 can be moved to a different x-y position to acquire imagery data for sample 6. At each sampling or interrogation point in such a scan, measurements provide deflection of cantilever 4 and contact resonance frequency CRF as a function of time or position of cantilever 4 with respect to sample 6. Deflection data (e.g., feedback frequency 45) of cantilever 4 can be converted into applied force, e.g., by applying a cantilever stiffness calibration to the deflection data. Contact resonance frequency CRF data (e.g., a change in CRF) can be converted into contact stiffness, e.g., by applying a clamp-spring-coupled model to the deflection data.

Figure 7:
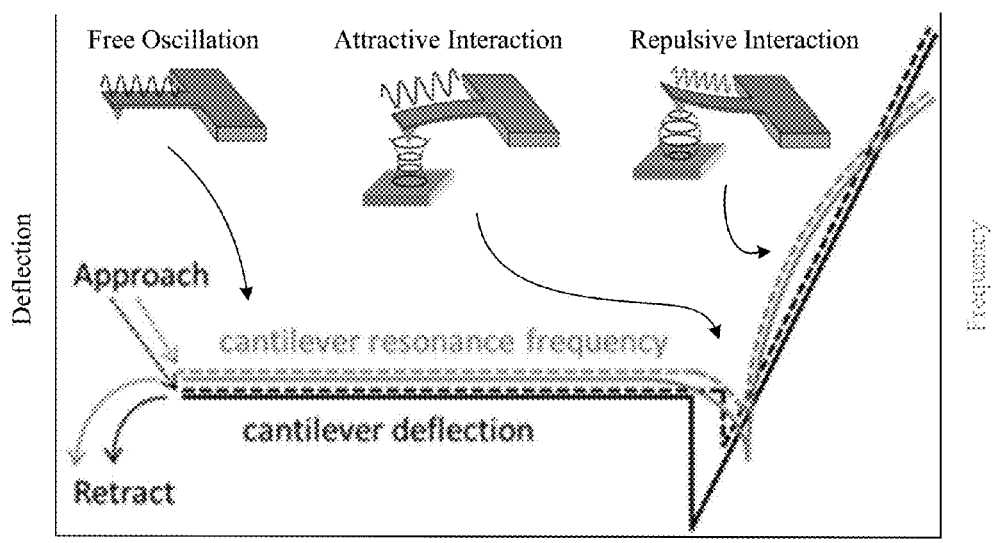
FIG. 7 shows a graph of deflection and resonance frequency change versus separation between a cantilever tip and sample.
Figure 8:
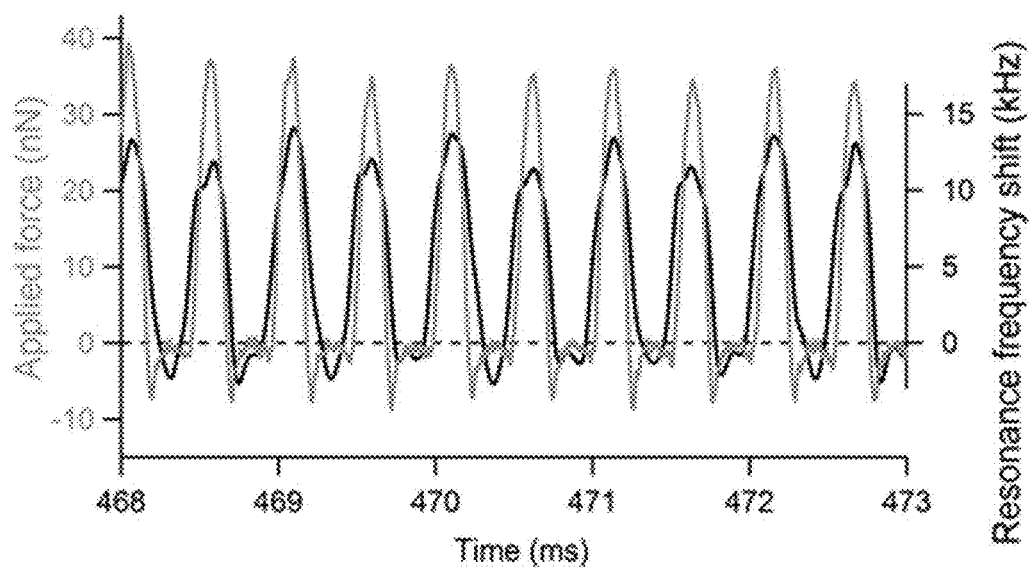
FIG. 8 shows a graph of applied force and resonance frequency shift versus time.
Figure 9:
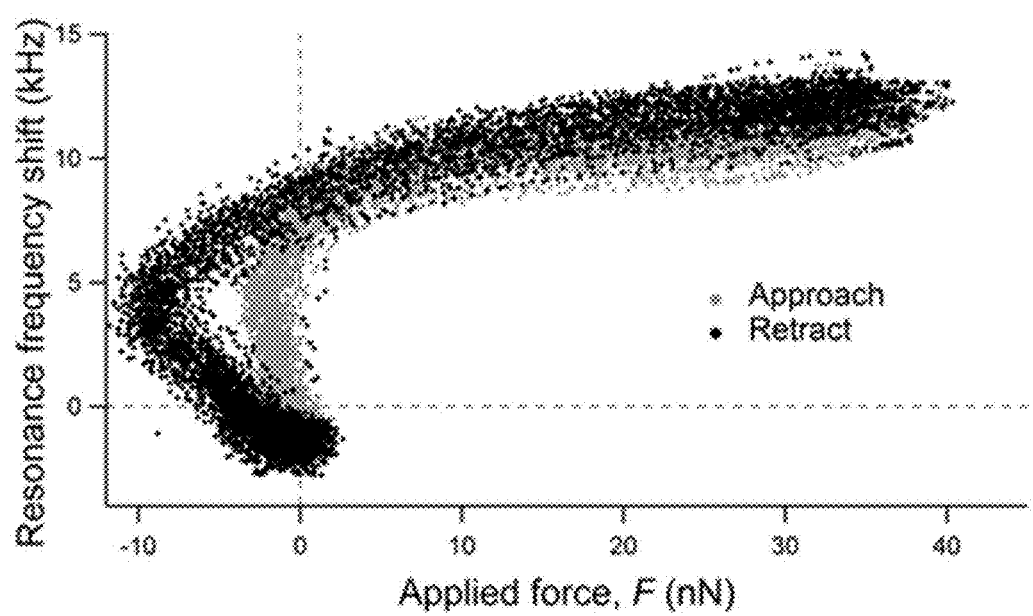
FIG. 9 shows a graph of resonance frequency shift versus applied force.

FIG. 7 shows a graph of contact resonance frequency (right-hand ordinate) and deflection of cantilever 4 (left-hand ordinate) versus separation between cantilever tip 42 and sample 6. Measurements made for a repulsive interaction between cantilever 4 and sample 6 provide mechanics of tip 42—sample 6 deformation in terms of contact stiffness and contact damping. Applying a contact mechanics model for tip 42—sample 6 contact, these measurements can be converted into elastic modulus and damping coefficient of sample 6. Measurements made for an attractive interaction and repulsive interaction can be analyzed to determine dynamics of contact formation and contact breaking during each oscillation of sample 6 with respect to cantilever 4. Force and change in contact resonance frequency for successive oscillations data are shown in FIG. 8, which can provide force or depth dependence of the contact stiffness of sample 6 subject to contact with cantilever 4. In particular, FIG. 8 shows a graph of applied force (left-hand ordinate) and contact resonance frequency shift (right-hand ordinate) versus time for a plurality of intermittent contacts (10 periods shown) between cantilever 4 (modulated at contact resonance frequency CRF) and sample 6 (modulated at scan modulation frequency SMF), and FIG. 9 shows a graph of contact resonance frequency shift versus applied force (so-called force-frequency curve) produced from the applied force and contact resonance frequency shift acquired for contacts between cantilever 4 and sample 6.

In an embodiment, intermittent contact resonance atomic force microscope 2 is operated such that tip 42 intermittently contacts sample 6 during scanning. As a result, a geometry of tip 42 is preserved from being deteriorated, feedback control of contact resonance modulation 12 is adjusted rapidly for imaging sample 6, and surface features of sample 6 are tracked with little or substantially no damage. At an intermittent contact of tip 42 to sample 6, tip 42 is subjected to modulation to position tip 42 in-contact and out-of-contact with sample 6 such that tip 42—sample 6 contact stiffness varies accordingly. This variation in contact stiffness is observed in a change of eigenmode frequencies of cantilever 4. To detect the change in the eigenmode frequency of cantilever 4, a fast detection by a high-speed oscillation controller such as cantilever controller 18 (e.g., operated in a phase-locked-loop) measures the frequency changes during each tap between tip 42 and sample 6. A three-dimensional (3D) data volume is generated from collecting depth dependence of contact resonance frequency CRF at each point in a scan of sample 6. These data include a tomographic representation of sub-surface stiffness field of sample 6. High-spatial resolution and correlation between a 3D stiffness map (see, e.g., FIG. 5B) and surface topography of sample 6 (see, e.g., FIG. 5C) are provided by data acquired by intermittent contact resonance atomic force microscope 2.

According to an embodiment, a process for acquiring intermittent contact resonance atomic force microscopy data includes selecting cantilever 4, wherein cantilever 4 includes a stiffness and eigenmodes effective to provide a contact resonance atomic force microscopic measurement on sample 6. Moreover, selecting cantilever 4 can include considering a mechanical property of tip 42 and sample 6, a geometry of tip 42—sample 6 contact, an applied force during scanning sample 6 with cantilever 4, and the like.

The process further can include controlling cantilever 4 with cantilever controller 18 to provide the lock frequency to contact resonance modulator 8, the lock frequency based on feedback frequency 45; subjecting cantilever 4 to modulation at contact resonance frequency CRF; and performing a sweep measurement of contact resonance frequency CRF at a maximum applied force (e.g., to observe a shift in CRF at a maximum applied force prior to ICR-AF microscopy scans) at a plurality of locations on sample 6. Additionally, the process includes subjecting cantilever 42 contact resonance frequency CRF at a first eigenmode of cantilever 4, the first eigenmode being selected based on a shift of contact resonance frequency CRF observed from performing the sweep measurement of contact resonance frequency CRF. The process also optionally includes adjusting a bandwidth or gain of cantilever controller 18 to detect the shift in resonance frequency of the selected eigenmode due to interaction of cantilever 4 and surface 6; performing contact resonance atomic force microscopy during approach and retraction of tip 42 to sample 6 at a first speed, wherein the first speed is comparable to a second speed at which intermittent contact resonance atomic force microscopy is performed; performing intermittent contact atomic force microscopy during scanning of cantilever 4 relative to sample 6 at a plurality of force-controlled intermittent contacts between cantilever 4 and sample 6 (e.g., optionally performing peak force tapping (PFT) with feedback control based on a peak force of a plurality of taps between cantilever 4 and surface 6); adjusting the bandwidth, the gain, or a combination thereof of cantilever controller 18 to track a maximum frequency shift of contact resonance frequency CRF during scanning, wherein a time constant of cantilever controller 18 is commensurate with a sampling time interval during each intermittent contact (where sampling time interval=tap period/number of measurements per tap); adjusting an acquisition speed for collection of a plurality of signals (e.g., contact resonance frequency shift, amplitude, and the like) from cantilever controller 18 and feedback frequency 45 at the sampling speed; stepping sample 6 to a different (x, y) position with respect to cantilever 4; acquiring data for intermittent contact resonance atomic force microscopy (ICR-AFM) at the different (x, y) position of sample 6; optimally performing low-pass filtering (real-time or post-acquisition) of cantilever deflection (e.g., feedback frequency 45) to decrease interference from contact resonance modulation 12 and data sampling.

According to an embodiment, a process for analyzing ICR-AFM data (e.g., cantilever deflection and frequency shift) includes performing a stiffness calibration for cantilever 4; converting the cantilever deflection into an applied force; determining a depth dependence of contact stiffness for sample 6 using the stiffness calibrated ICR AFM data; correlating the ICR-AFM data with surface topography (e.g., provided by AFM) to determine a three-dimensional mechanical property of sample 6, based on contact stiffness of sample 6; synchronizing force and contact stiffness ICR-AFM measurements obtained during contact to determine tip 42—sample 6 contact mechanics and to determine a property such as elastic modulus, contact damping, adhesive force, and the like; and determining a variation in a sub-surface mechanical property of sample 6 based on the depth or force dependence of contact stiffness provided by ICR-AFM measurements.

ICR-AFM 2 has numerous benefits and advantages such as tip 42 of cantilever 4 intermittently contacts sample 6 during scanning such that a geometry of tip 42 is preserved. Also, feedback control of contact resonance modulation 12 of cantilever 4 is rapidly adjustable, and a surface feature of the sample 6 can be imaged with less damage than if sample 6 was subjected to conventional atomic force microscopy. Moreover, ICR-AFM 2 provides high-depth sensing and lateral spatial resolution of sample 6 as well as subjecting sample 6 to acquisition of ICR-AFM data for determination of nanomechanical properties of sample 6 at a small scale, wherein sample 6 can be a hard material having a surface feature that is less than 10 nm in a lateral width to provide sub-nanometer depth sensitivity of sample 6. Moreover, ICR-AFM 2 is integrable into conventional AFM instrumentation.

With regard to contact resonance frequency CRF and scanned modulation frequency SMF, in an embodiment, contact resonance frequency CRF is greater than scan modulation frequency SMF. Moreover, scan modulator 10 provides displacement of sample 6 in a substantially similar direction as a displacement of cantilever 4 provided by contact resonance modulator 8, and ICR-AFM 2 is configured to displace sample 6 in a two-dimensional plane that is substantially perpendicular to contact resonance modulation 12 of cantilever 4. Further, scan modulator 10 provides intermittent contact between cantilever 4 and sample 6 at scan modulation frequency SMF, and an amplitude of displacement of cantilever 4 at contact resonance frequency CRF is less than an amplitude of displacement of sample 6 at scan modulation frequency SMF. Advantageously, contact resonance frequency CRF is independent from scan modulation frequency SMF. In a particular embodiment, contact resonance frequency CRF includes an eigenmode of cantilever 4.

In some embodiments, ICR-AFM provides a stiffness map of sample 6, a surface topography of sample 6, or combination thereof. The surface topography can be based on intermittent contact between cantilever 4 and a plurality of spots on the sample, and contact resonance frequency CRF can be greater than or equal to 10 kilohertz such that an intermittent contact period is less than 100 μs. Additionally, scan modulation frequency SMF can be from a few hundreds of hertz to a few kilohertz. Contact resonance frequency CRF can be from a few tens of kilohertz to a few megahertz. A ratio of scan modulation frequency SMF to contact resonance frequency CRF can be selected to collect data on depth sensitive materials properties of sample 6 (e.g., three-dimensional stiffness values), and such ration can be from 1:100,000 to 1:10.

Moreover, intermittent contact resonance atomic force microscope 2 provides atomic force microscopy with force-controlled non-eigenmode modulation in an absence of an artifact in acquired data such as ringdown as an artifact. Inclusion of a phase-locked loop (PLL) in cantilever controller 18 provides high-speed acquisition of data for intermittent contact resonance atomic force microscopy at a speed sufficient for imaging sample 6 to provide for three-dimensional tomographic data acquisition. Further, it is contemplated that cantilever 4 includes no property such as eigenmode frequencies, shape of tip 42, material of tip 42, calibrated stiffness, and the like.

In an embodiment, ICR-AFM 2 includes scan modulation 14 at scan modulation frequency SMF (e.g., a slow amplitude modulation relative to contact resonance frequency CRF for imaging and force control) and contact resonance modulation 12 at contact resonance frequency CRF (e.g., a fast frequency modulation relative to scan modulation frequency SMF for resonance frequency measurement). Accordingly, ICR-AFM 2 is configured to operate with a high-speed contact resonance modulation 12 with a force-controlled intermittent AFM mode for scan modulation 14 at scan modulation frequency SMF, which is set to a frequency that is a non-eigenmode of cantilever 4. In this manner, ICR-AFM 2 detects a change in resonance frequency of the eigenmode of cantilever 4 during an intermittent contact between cantilever 4 and sample 6 and eliminates cross talk between contact resonance modulation 12 and scan modulation 14.

It is contemplated that cantilever controller 18 operates at a high speed sufficient to provide detection for observing changes of resonance frequency of cantilever 4 during intermittent contact between cantilever 4 and sample 6. In an embodiment, such measurements are converted into a three-dimensional mechanical property representation. Moreover, ICR-AFM 2 is configured: to perform time-synchronized force and resonance frequency measurements during force-controlled intermittent AFM modes; to provide a dynamical mechanics characterization at a nanoscale in addition to quasi-static force-distance measurements; to determine the force or depth dependence of contact stiffness during force-controlled intermittent AFM modes; to obtain a three-dimensional qualitative or quantitative characterization of mechanical properties (e.g., stiffness, adhesion, damping, and dissipated power) of a material volume proximate to a surface of sample 6 scanned by cantilever 4; to characterize contact formation or contact breaking dynamics in force-controlled intermittent AFM modes; and the like.

The articles and processes herein are illustrated further by the following Examples, which are non-limiting.

EXAMPLES

Example 1

Laboratory ICR-AFM

An ICR-AFM was constructed and operated in an ICR-AFM mode. The ICR-AFM was configured to track a change in the resonance frequency of an eigenmode of a vibrating AFM cantilever during individual oscillations (taps) as the AFM probe intermittently contacted a surface during a fast scanning (imaging) mode. The scanning mode used was PFT, which provided an intermittent contact mode at frequencies of a few kHz and feedback control for the maximum applied force (peak force). The ICR-AFM combined PFT with high-speed phase-locked loop (PLL) instrumentation for independently tracking the change in the resonance frequency of the cantilever. In ICR-AFM, the force-distance curves from PFT were synchronized with the resonance frequency measurements from PLL so that a contact stiffness versus force (or distance) curve was obtained at an arbitrary points in the scan.

The PFT amplitude modulation was operated at 2 kHz on an AFM (commercially available as MultiMode V AFM from Bruker) with a peak force of 35 nN and modulation amplitude of 8 nm. The AFM cantilever used for ICR-AFM measurements was a cantilever with a silicon tip (commercially available as PPP-SEIH integrated Si probe from NanoSensors, Neuchatel, Switzerland) with a cantilever spring constant of 9.12±0.07 N m$^{-1}$ as determined by using a laser-Doppler vibrometer and thermal calibration methods developed at NIST. The cantilever had three out-of-contact flexural resonance frequencies at 107.3 kHz, 670.5 kHz, and 1865.5 kHz.

An independent frequency modulation of small amplitude was added to the cantilever and controlled by a PLL system (commercially available from SPECS, Zurich, Switzerland).

The two modulations were applied to the tip—sample contact through two separated modulators (a contact resonance modulator and an independent scan modulator) and at independent frequencies for crosstalk reduction. For the scan modulator, the scan modulation frequency for amplitude modulation was at 2 kHz (a non-eigenmode of the cantilever). For the contact resonance modulator, the contact resonance frequency for the frequency modulation of the cantilever was at one eigenmode of cantilever. In a particular experiment, the fast modulation of the cantilever relative to the scan modulation was done at the third eigenmode frequency of the cantilever. During an intermittent contact of the cantilever tip with a sample, the tip was brought in and out of contact during one PFT oscillation such that the resonance frequency of the cantilever shifted from its free value to higher and higher values and reverted to its free value: on approach of the cantilever to the sample, a high load imposed a high shift in the contact resonance frequency of the cantilever; on retract of the cantilever from the sample, a lower applied load provided a lower shift in the contact resonance frequency; and when the cantilever was out-of-contact with the sample, the resonance frequency of the cantilever returned to its free oscillation value.

Example 2

Sample Imaging

Measurements were made on a sample of polystyrene-poly(methyl methacrylate) (PS/PMMA) film containing sub-micrometer size PMMA domains. The PS/PMMA sample was prepared from xylene solution mixed in a 50-50 ratio (PS had Ww of 21000 and Wm of 17 000); PMMA had Ww of 53 000 and Wm of 35 000).

Figure 10:
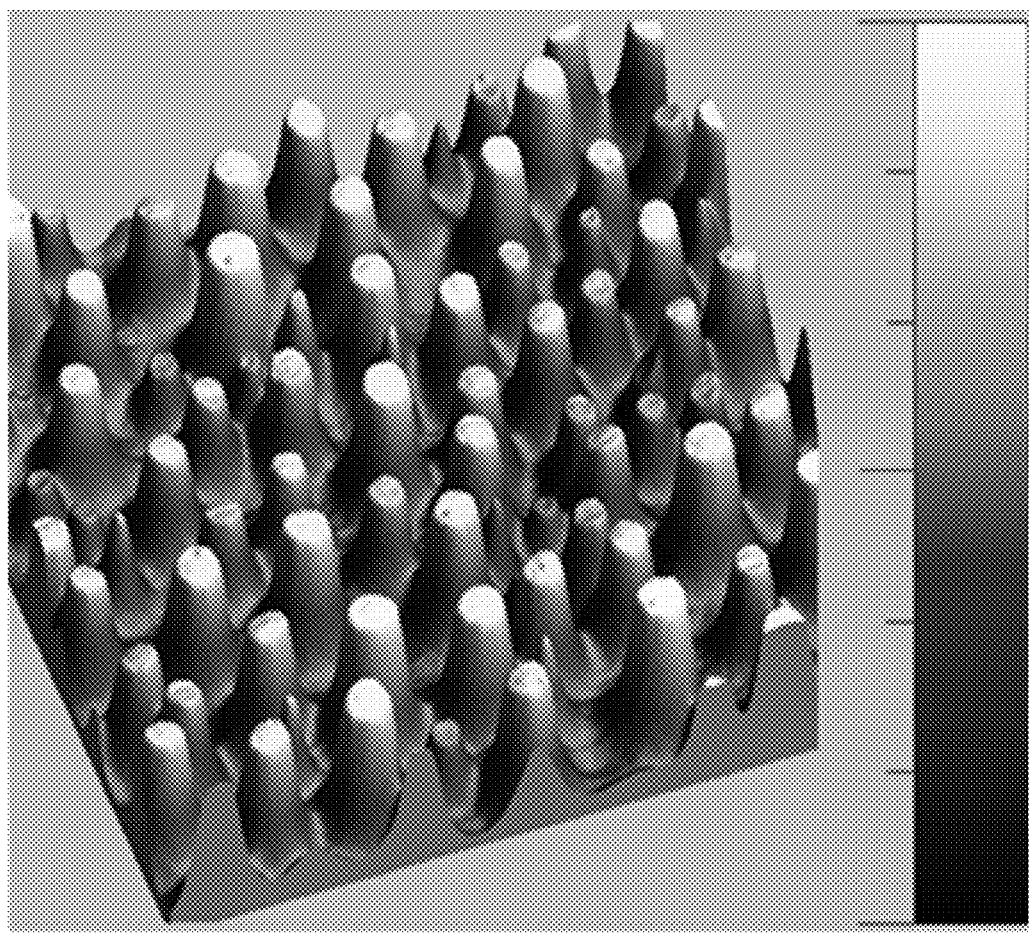
FIG. 10 shows a micrograph of a sample according to Example 1.

FIG. 10 shows an AFM micrograph of the sample for a topography of a 5.0 μm×5.0 μm. The PMMA phase was cylindrical pillars surrounded by the PS matrix. A difference in elastic moduli of PS and PMMA of 3.4 GPa for PS and 3.0 GPa for PMMA was expected to provide a contrast in contact resonance frequency response when areas encompassing both PS and PMMA regions were mapped with the ICR-AFM. A maximum resonance frequency shifts was 15 kHz and amplitude damping was 80% from out of contact to contact was observed during measurements, and the PLL uncertainties were on the order of a few tens of Hz.

FIGS. 11A, 11C, 11E, 11G, 11I, and 11K respectively show maps of topography, adhesion, dissipation, DMT modulus, resonance frequency shift with slow PLL, and resonance frequency with fast PLL over 5 μm×2.5 μm area of the PS/PMMA sample for data from ICR-AFM using the dual modulation microscope. In these maps, the PMMA regions are visible as circles and PS as the matrix. Accordingly, FIGS. 11B, 11D, 11F, 11H, 11J, and 11L show a graph of the respective characteristic versus distance for the maps shown FIGS. 11A, 11C, 11E, 11G, 11I, and 11K along the dotted scan line shown in FIG. 11A. Here (e.g., FIGS. 11G and 11H), DMT modulus refers to an elastic modulus calculated from a Derjaguin, Muller, and Toporov (DMT) model.

In ICR-AFM measurements, the measurement frequency was controlled by the PLL time constant, which was significantly higher than the tapping frequency of 2 kHz and provided enough measurement points during each oscillation (tap) while being less than the frequency of the eigenmode used to provide good detection. The third eigenmode of the cantilever was excited by the contact resonance modulator and communication with the cantilever, and the PLL time constant was adjusted to be between these frequency constraints. A first example of PLL time constant adjustment is shown in FIGS. 11I and 11K for resonance frequency shift maps acquired with feedback from PLL signals to provide resonance frequency tracked with a slow PLL time constant (FIG. 11I, 100 μs time constant) and with a fast PLL time constant (FIG. 11K, 1 μs time constant).

Figure 12A:
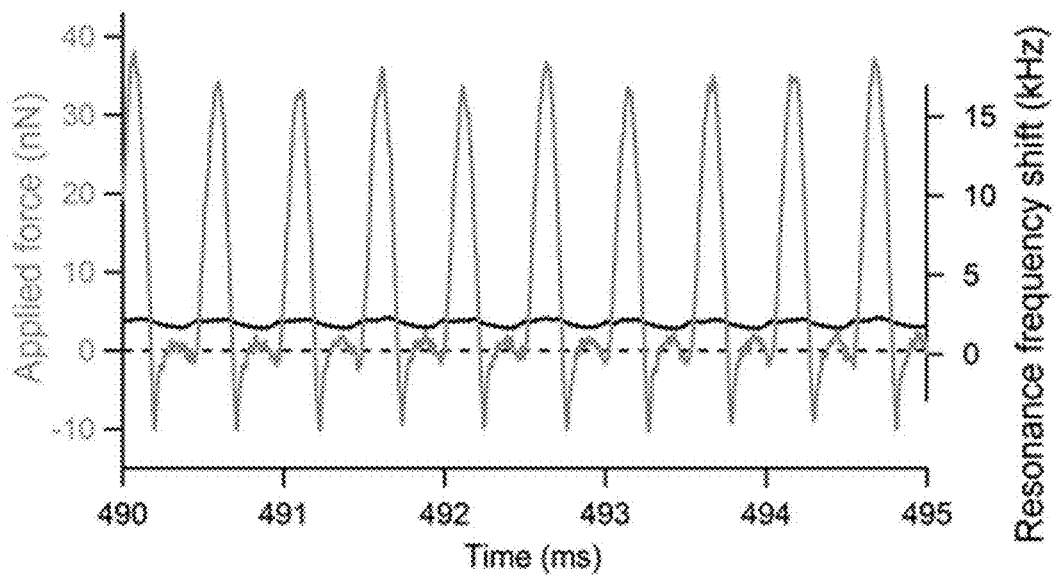
FIGS. 12A and 12B show a graph of applied force and contact resonance frequency versus time for the sample shown in FIG. 10.
Figure 12B:
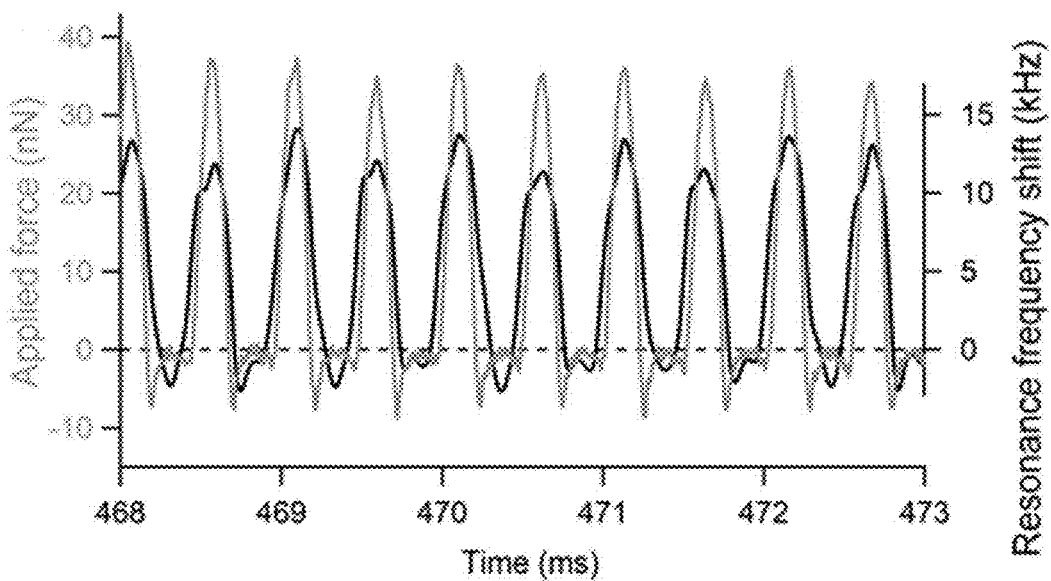

Additionally, force and resonance frequency shift along few successive PFT oscillations during scanning over PS were determined when the resonance frequency shift was tracked with a slow PLL time constant for detection (see FIG. 12A) and a fast PLL time constant for detection (see FIG. 12B). For each time constant, the imaging scan speed was 1 Hz. Here, short scanning segments from a high-speed data capture at a rate of 500 kHz over a PS region are shown in FIGS. 12A and 12B respectively for the slow and fast PLL time constant detections. For the slow PLL time constant detection (FIG. 12A) the measured contact resonance frequency shifts are within 1 kHz from the free resonance frequency with no significant force dependence. However, for the fast PLL time constant detection (FIG. 12B), the contact resonance frequency shows shifts as large as 15 kHz at the peak force and responds to the force variation during each oscillation. From these observations, three-dimensional characterization of the nanomechanical properties of the sample can be obtained at imaging speeds.

Figure 13:
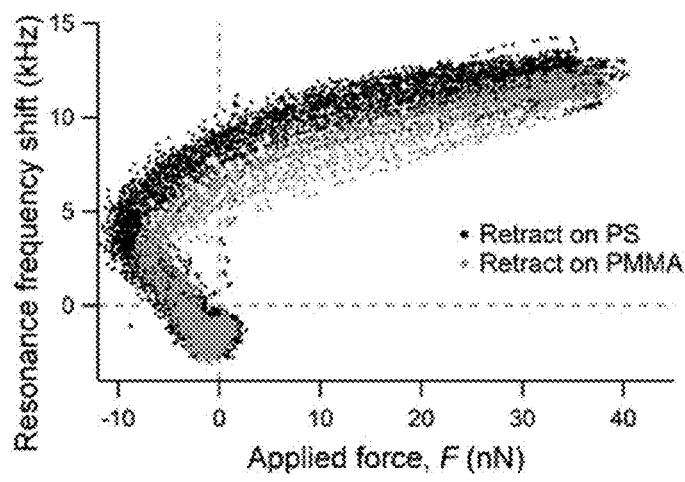
FIG. 13 shows a graph of resonance frequency shift versus applied force for the sample shown in FIG. 10.

A small data subset of measurements acquired with a fast PLL over the region marked by arrows in FIG. 11A was analyzed, wherein the data covered 58 oscillations over PMMA and 122 oscillations over PS (on both sides of the PMMA region). The measurements are shown in FIG. 13 in the form of resonance frequency shift versus applied force. It can be seen that the resonance frequency shift provided a clear distinction between the two materials at any given force on either approach or retract portions. The retract portions contained additional data on the adhesion effect and detachment point and were subjected to further modeling and analysis.

A force dependence of the contact radius "α" between the tip of the cantilever and sample can be modeled as provided in formula 1.

$$a = \left(\frac{3R_T}{4E^*}\right)^{1/3} \left(\frac{\tau_1}{\sqrt{4-\tau_1^2}}\sqrt{3F_a} \pm \sqrt{F+F_a}\right)^{2/3}. \quad (1)$$

where $R_T$ is the tip radius, $F_a$ is the maximum adhesive force at the detachment of the tip—sample contact, and the reduced elastic modulus $E^*$ is given in terms of the indentation moduli of the tip and sample, $1/E^*=1/M_T+1/M_S$. For elastically isotropic materials the indentation modulus can be expressed in terms of the Young's modulus E and the Poisson's ratio v, $M=E/(1-v^2)$. The signs (+) and (−) in formula 1 indicate a stable (tip is continuously in contact with the sample) and unstable (tip is pulling off and away from the sample) contact regions.

For high-speed indentation of an elastomer in a fast oscillating indentation such as that in ICR-AFM, viscoelastic effects can hinder the peripheral variations imposed by the oscillation onto the contact area. As a result, the contact area can remain approximately constant during an oscillation and the contact geometry resembles that of a "flat punch" configuration (an indenter with circular flat end). In the limit of this dynamic flat punch approximation, the expression of contact stiffness reduces to $k^*=2\alpha E^*$, with the contact stiffness k* being proportional to the contact radius α. An expression for the contact stiffness of a dynamic flat punch is given by formula 2.

$$k^* = (6R_T E^{*2})^{1/2} \left( \frac{\tau_1}{\sqrt{4-\tau_1^2}} \sqrt{3F_a} \pm \sqrt{F+F_a} \right)^{2/3} \quad (2)$$

with $R_T$ the tip radius, $F_a$ is the adhesive force, $\tau_1$ the transition parameter defined as in the Schwarz model as the square root of the ratio between the work against the short-range adhesive forces and the total work of adhesion, ranges from 0 to 1. Formula 2 is rearranged to show a linear relationship between $\sqrt{F+F_a}$ and $\sqrt[3]{k^{*3}}$ in formula 3.

$$\sqrt{F+F_a} = |\alpha \sqrt[3]{k^{*3}} - \beta| \quad (3)$$

wherein $\alpha = 1/\sqrt{6R_T E^{*2}}$ and $\beta = \sqrt{3F_a}\tau_1/\sqrt{4-\tau_1^2}$.

Figure 14A:
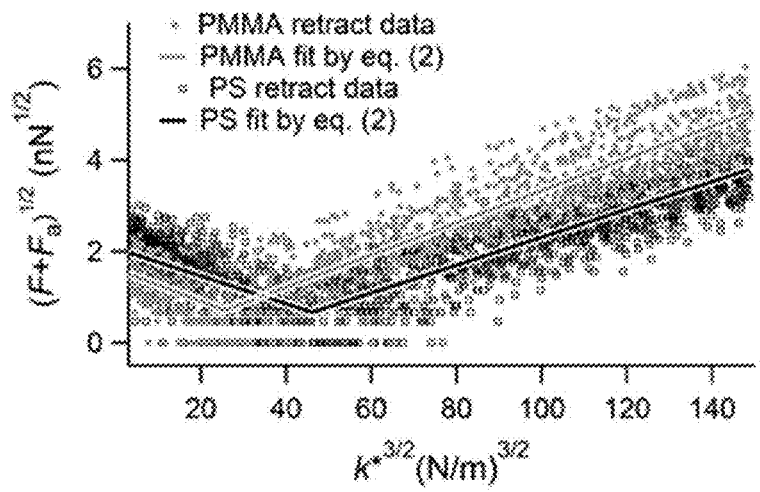
FIG. 14A shows a graph of $(F+Fa)^{1/2}$ versus $K^{*3/2}$ for the sample shown in FIG. 10.
Figure 14B:
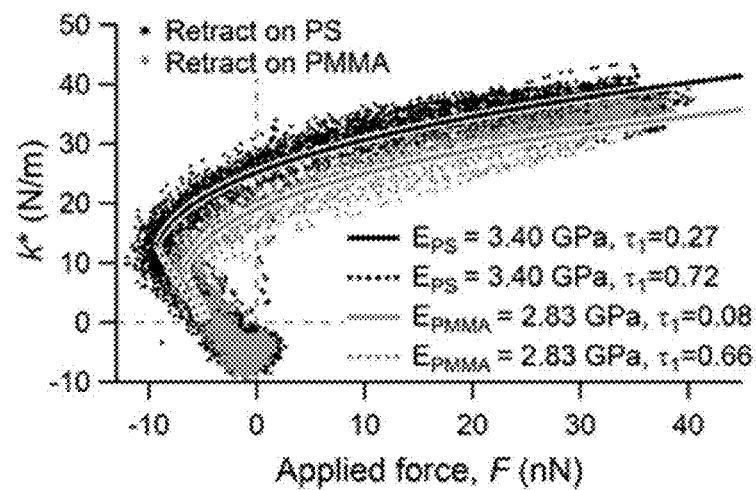
FIG. 14B shows a graph of $K^*$ versus applied force for the sample shown in FIG. 10.

This linear dependence was probed in FIG. 14A using retract data around the detachment point (F=−Fa) on the PS and PMMA: at the left of the detachment point, the data were fit by the unstable solution and at the right of the detachment point by the stable solution. For each material, the unstable and stable regions were fitted simultaneously by considering the same value of α for both of them and a different value of β, which means a different value of $\tau_1$ for each region. For the fits shown in FIG. 14A, the tip radius was adjusted to 12.95 nm to provide an indentation modulus of 3.73±0.10 GPa for PS, which was considered as a reference material. The indentation modulus of PS was calculated by considering 3.40 GPa and 0.33 for the Young's modulus and Poisson's ratio of PS, respectively. With that and the measured average $F_a$=9.64 nN, the best fit for PS data indicated a transition parameter $\tau_1$ of 0.27±0.04 for the stable branch and 0.72±0.01 for the unstable branch. For PMMA, with $R_T$=12.95 nm and $F_a$=7.17 nN, the best fit was for an indentation modulus of 3.22±0.09 GPa and a transition parameter going from 0.08±0.04 for the stable branch to 0.66±0.03 for the unstable branch. The determined indentation modulus of PMMA can be converted into 2.83±0.08 GPa Young's modulus by considering an average Poisson's ratio of 0.35 for PMMA. All uncertainties represent one standard deviation of the calculated values. The theoretical stiffness—force curves for the found fit parameters are plotted as solid lines along with measurements in FIG. 14B.

In comparison with force-distance measurements, the ICR-AFM measurements and their fits indicated sensitivity in differentiating the mechanical response of the two probed elastomers. Thus, in terms of their elastic moduli, a clear difference was determined between PS (3.4 GPa) and PMMA (2.8 GPa) with ICR-AFM whereas in either individual force-distance curves (not shown here) or maps no distinct contrast between PS and PMMA was observed. The advantage of ICR-AFM over force-distance measurements is that it provides a measurement for the contact stiffness at any applied force, whereas with force-distance measurements, the contact stiffness could be calculated from the derivative of the measurements and it is not accurate around the contact point due to the reduced number of measurements. In addition, a detailed depth-dependent contact stiffness measurement provides an improved validation of the contact model used over the entire contact depth. In the present case, it was possible to differentiate the transition parameter $\tau_1$ of the Schwarz model during contact deformation, 0.3 for PS and 0.1 for PMMA.

Qualitatively, this result agrees with the measurement of a smaller adhesive force on PMMA than PS. Data were obtained in the contact detachment region, with a negative slope of stiffness versus force curve. In this region, the transition parameter $\tau_1$ has comparable values for both materials, slightly bigger on PS than PMMA, which indicates that, at least for these data sets, the response in this region is dominated by the contact geometry and less specific to material properties.

The ICR-AFM provided capabilities of interrogating surfaces during a force-controlled tapping mode. The technique of ICR-AFM used fast resonance frequency PLL tracking of a higher eigenmode of a cantilever during PFT imaging. Shifts in the resonance frequency of the third eigenmode of the cantilever were measured and correlated with the deflections of the cantilever to determine the induced changes in the tip—sample stiffness during individual PFT oscillations on a PS/PMMA blend. Besides the contact stiffness characterization, the dual modulation microscope sensitively resolved the adhesive response of the sample An improved quantitative measurement of the elastic moduli of PS (3.4 GPa) and PMMA (2.8 GPa) was provided by collecting the depth-dependence of the contact stiffness during successive tapping oscillations while imaging. Detailed contact stiffness measurements over the entire contact depth provided robust verification of the applicability of a contact model that includes both long and short-range adhesive forces. The mechanical differences between the PS and PMMA in the sample were demonstrated in terms of elastic moduli and transitional parameters. ICR-AFM provides quantitative mechanical property measurement such that the ICR-AFM can be used as a depth sensing instruments for three-dimensional characterization of near-surface mechanical properties of various nanocomposite materials.

Example 3

Depth Sensitivity of the ICR-AFM

Figure 15A:
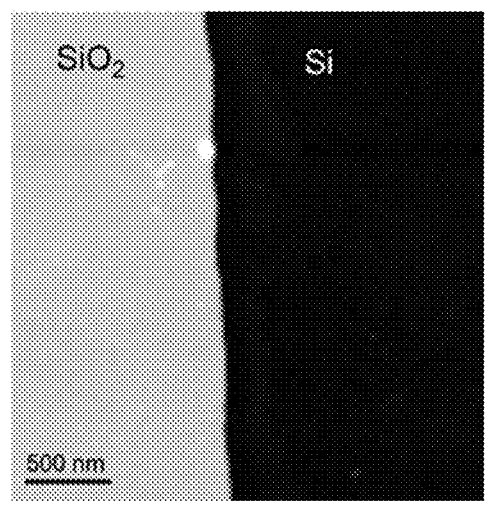
FIG. 15A shows a micrograph of a sample according to Example 2.
Figure 15B:
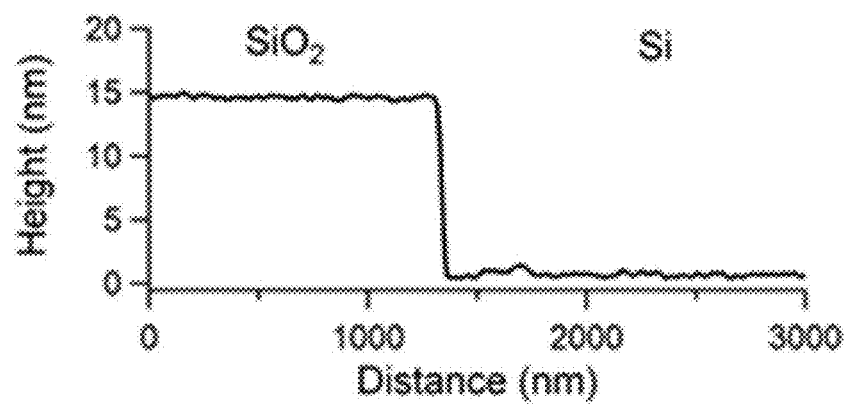
FIG. 15B shows a graph of height versus distance for the sample shown in FIG. 15A.
Figure 15C:
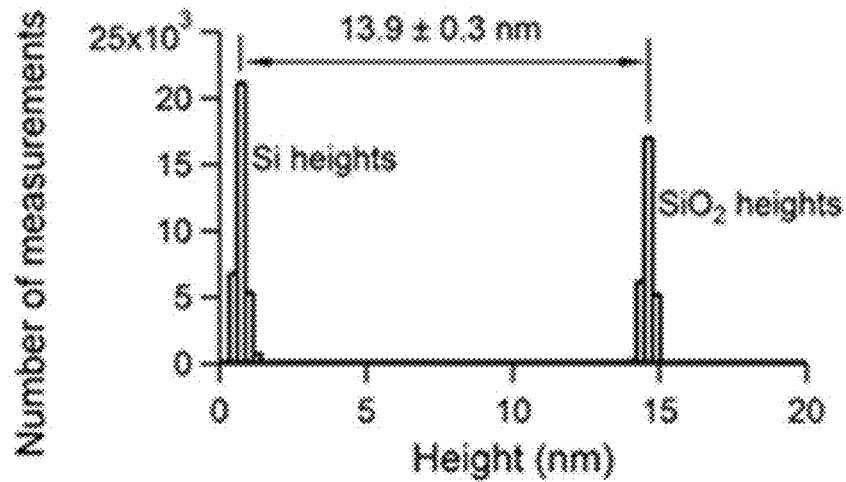
FIG. 15C shows a graph of number of measurements versus height for the sample shown in FIG. 15A.

A diamond coated silicon tip with spring constant of $k_c$=3.1±0.1 N/m was used to test the depth sensitivity of the dual modulation microscope described in Example 1 on a stiff material (Si and Sift). The first three out-of-contact eigenmode frequencies of the tip were measured at: $f_1^{air}$=89.4 kHz, $f_2^{air}$=577 kHz, and $f_3^{air}$=1,633.7 kHz, respectively. The sample used for testing the depth sensitivity of the ICR-AFM on stiff materials was a $SiO_2$/Si patterned sample. The patterned structure of the sample consisted of etched tranches through a 14 nm thick $SiO_2$ layer grown on a Si wafer (see FIGS. 15A, 15B, and 15C). As the applied force was increased on the modulated AFM tip, the shift in the contact resonance of the cantilever showed various depth dependences of contact stiffness responses between Si and $SiO_2$ regions. At very small applied forces some difference in the contact resonance frequency was expected between Si and $SiO_2$ regions due to Si covered by a native oxide layer of 1 nm to 2 nm thick $SiO_2$ so the stiffness response was from the oxide top layers. At higher applied forces, a stiffening increase was observed in the shift of the contact resonance frequency over the Si region compared with that over the $SiO_2$ region as the tip sensed deeper into the surface.

Figure 16A:
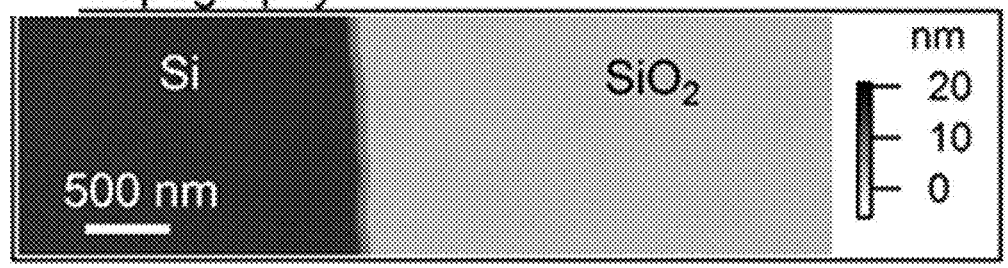
FIG. 16A shows a map of topography for the sample shown in FIG. 15A.
Figure 16B:
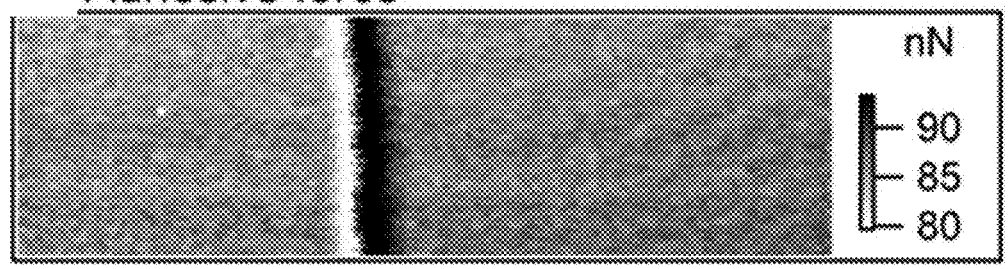
FIG. 16B shows a map of adhesive force for the sample shown in FIG. 15A.
Figure 16C:
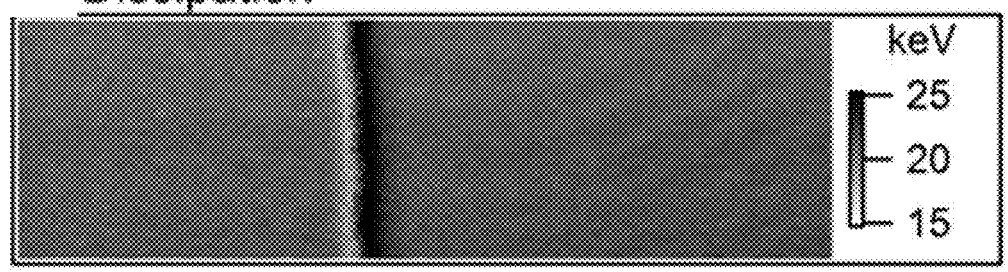
FIG. 16C shows a map of dissipation for the sample shown in FIG. 15A.
Figure 17A:
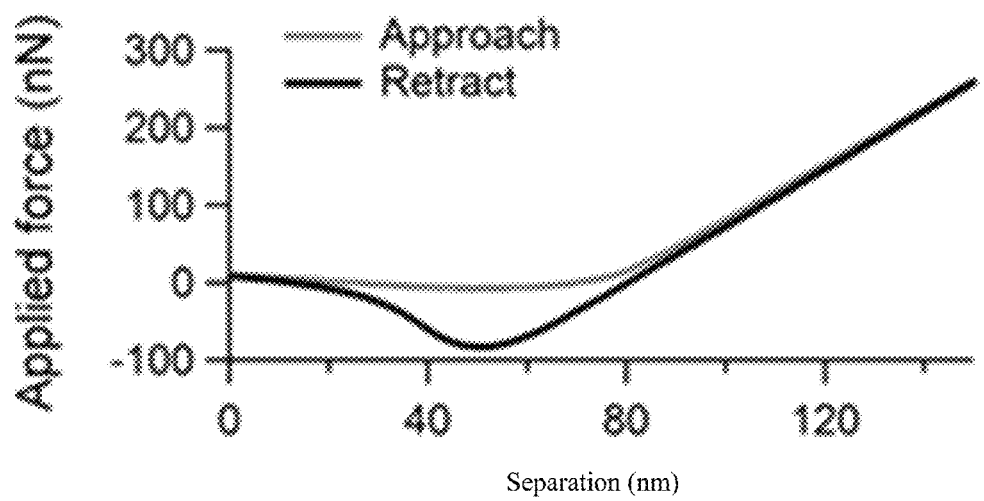
FIG. 17A shows a graph of applied force versus separation between the cantilever tip and sample for the sample shown in FIG. 15A.
Figure 17B:
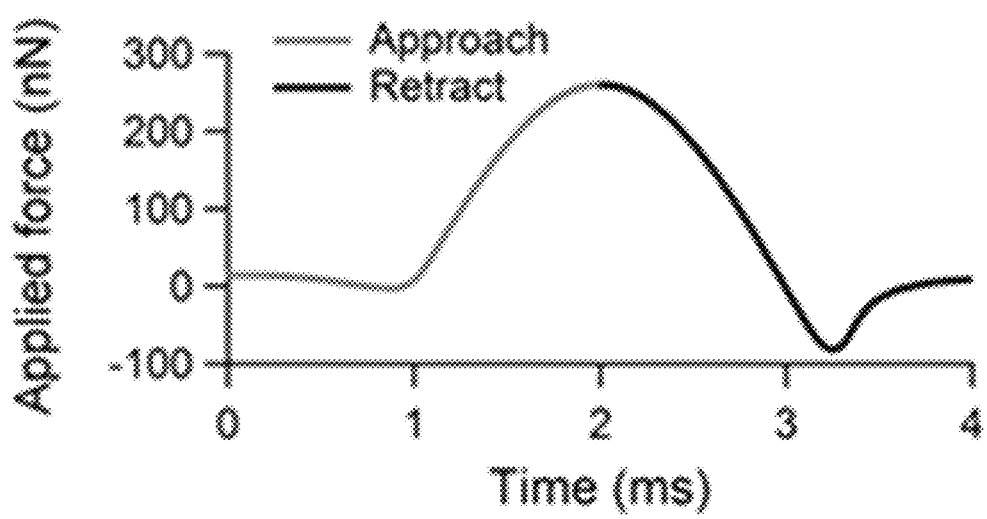
FIG. 17B shows a graph of applied force versus time for the sample shown in FIG. 15A.

On the $SiO_2$/Si sample, ICR-atomic force microscopy was performed during PFT scanning over a 1.3 μm×5.0 μm area around the step. PFT topography, adhesion, and dissipation maps collected during this scan are shown in FIGS. 16A, 16B, and 16C. Scanning was performed at a rate of 0.5 Hz (a trace and retrace scan lines made in 2 s) with a 512 pixel resolution. The PFT modulation during scanning was performed at a maximum applied force of 250 nN (peak force), amplitude of 75 nm, and rate of 0.25 kHz. With these settings, a single scan line consisted of about 240 taps. An example of the PFT oscillations (amplitude modulation at 0.25 kHz (oscillation period of 4 s) and 75 nm amplitude (150 nm piezo ramps)) of this scan is shown in FIGS. 17A and 17B in a force-distance and force-time curve. The high-frequency modulation was made by a PLL engaged in constant excitation mode. Frequency tracking of the first contact eigenmode during scanning was accomplished with PLL gains adjusted at 100 Hz/deg (proportional gain) and 25 μs (integral gain).

Figure 18:
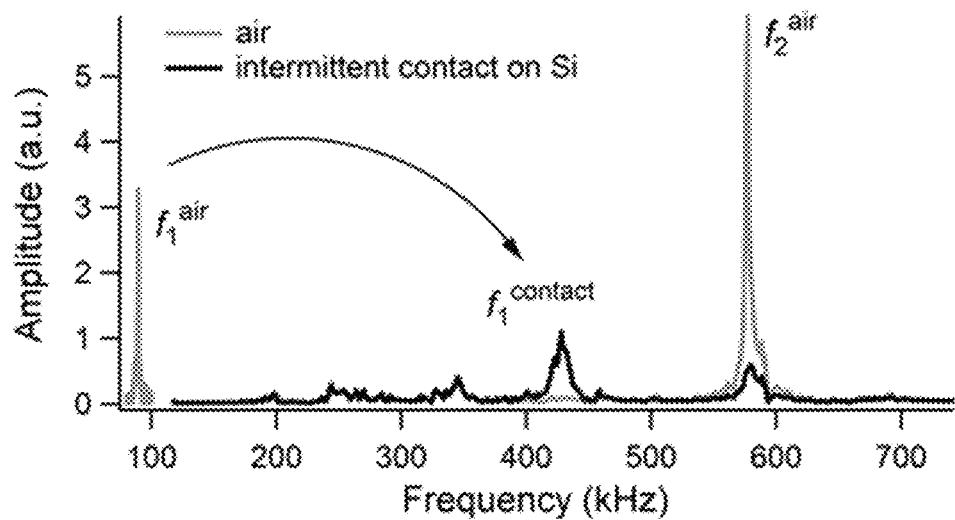
FIG. 18 shows a graph of amplitude versus frequency for the sample shown in FIG. 15A.
Figure 19:
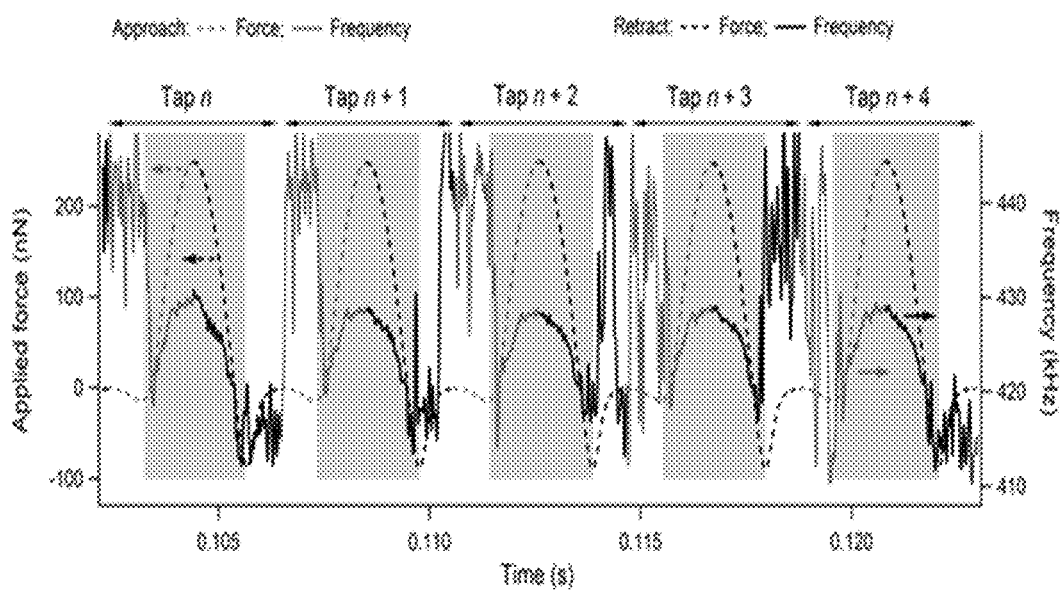
FIG. 19 shows a graph of applied force and frequency versus time for the sample shown in FIG. 15A.

Out-of-contact and in-contact frequency spectra over the 100 kHz to 800 kHz range is shown in FIG. 18. Within this frequency range, the out-of-contact spectrum shows the second resonance peak at 577.0 kHz and the in-contact spectrum shows the first contact resonance frequency in contact on Si during PFT scanning. The PFT amplitude modulation was reduced as much as possible to maximize the contact time without to affect the stability of the scan. Increasing the contact time provided a stable PLL detection of the change in the contact resonance frequency. FIG. 19 shows a free-resonance peak is significantly diminished compared with its out-of-contact value because the AFM tip spent a larger time in contact than out-of-contact during each PFT oscillation.

When the AFM tip was brought into contact with a sample, the shift in the resonance frequency of one of the cantilever eigenmodes is directly related with the contact stiffness. At applied forces within tens to hundreds of nN on compliant materials (elastic moduli of a few GPa), the shifts of contact resonance frequencies from their out-of-contact values were an order of few tens of kHz, and shifts were continuously tracked in-contact and out-of-contact PFT oscillations by PLL frequency detection. The first contact resonance frequency was tracked during PFT scanning over the SiO$_2$/Si step. The PLL was locked at a central frequency of 429.8 kHz (the contact resonance peak shown in FIG. 17) with a ±19.5 kHz window around this frequency. As explained above and shown in FIG. 19 for few consecutive PFT oscillations, the PLL was unlocked between contacts and locked during contacts (light gray areas in FIG. 19) when the resonance frequency comes within the ±19.5 kHz window around the central frequency. The shift in the resonance frequency during contacts was correlated with a change in the applied force. The contact resonance frequency increased as the applied force increased up to the maximum applied force (peak force) and decreased on retract when the applied force decreased.

Simultaneous acquisition of the cantilever deflection and resonance frequency shift was made by DAQ board at 500 kS/s and only along the trace direction of the scan lines. For later reconstruction and data correlation, the acquisition has to be correlated with the scan parameters of the AFM. In this case, for each scan line, the acquisition was triggered at the beginning of each scan line and performed for 1 s (the time necessary to complete a trace scan at the scan rate of 0.5 Hz). To eliminate the alias frequencies induced by digitization at 500 kHz, below the Nyquist frequency of the frequency modulation (about 900 kHz), a low-pass filtered at 20 kHz was used for the acquisition of the cantilever deflection signal. The acquisition, synchronized with the AFM scan, can be performed at any time during scanning and adjusted over any finite region inside the scanned area.

Figure 20:
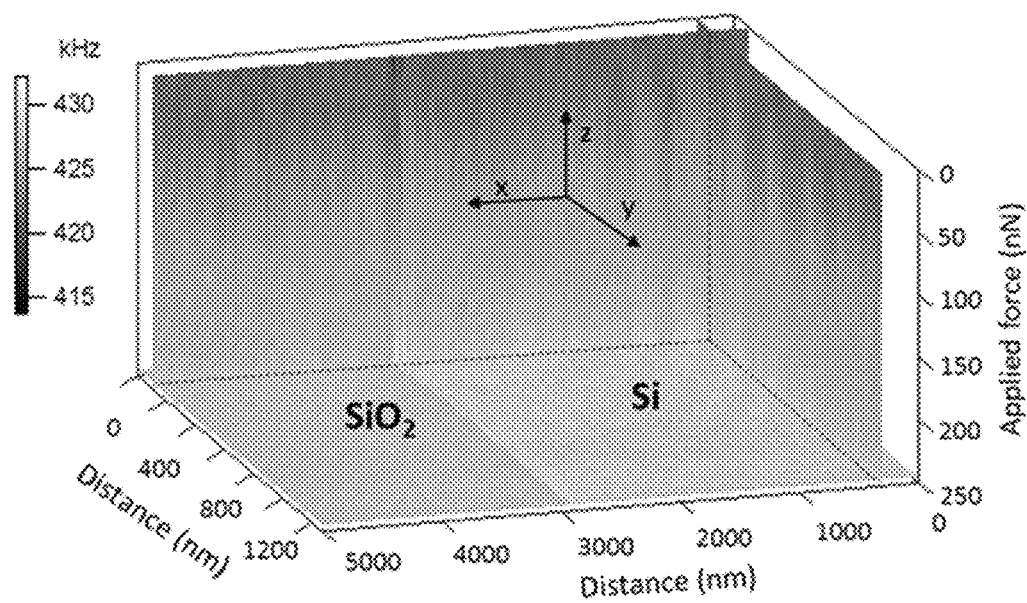
FIG. 20 shows a graph of frequency versus applied force and two-dimensional distance for the sample shown in FIG. 15A.

After data acquisition, the measured contact resonance frequencies were correlated with the applied force values and a three-dimensional (3D) volume of data were generated to detail the depth dependence of the contact stiffness over the scanned area. FIG. 20 shows tomographic cross-sections of the 3D force dependence of the contact resonance frequency over the scanned area. Each scan line (along the x direction) comes with a frequency versus force map (one example of such maps is shown in FIG. 20) and the 3D volume of data is produced by stacking up these maps. From the frequency-force contrast of the xz-plane of FIG. 20 or that of the map shown in FIG. 21, it can be concluded that the contact resonance frequency shifts to higher values over the Si region than SiO$_2$ region, which indicates the enhance stiffness of Si compared with SiO$_2$.

Figure 21:
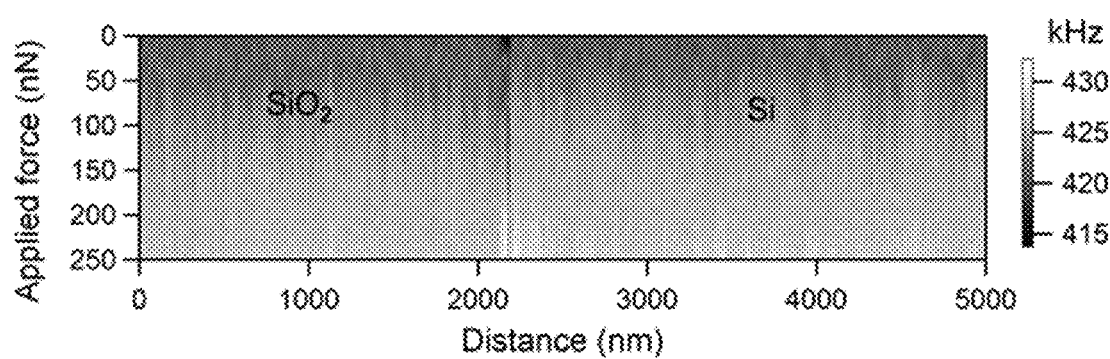
FIG. 21 shows a graph of frequency versus applied force and distance for the sample shown in FIG. 15A.

The difference in contact stiffness between Si and SiO$_2$ regions can be also analyzed from the contact resonance frequency maps at various applied forces (xy-cross sections in FIG. 19). FIG. 21 shows a series of successive maps at various applied forces along the retract parts of the PFT oscillations. From the color contrast of the maps (the color scale was adjusted in each map to enhance the contrast) and their corresponding histograms, the stiffness response of the two materials can be analyzed at different applied forces. Thus, at small applied forces, 50 nN to 100 nN (FIGS. 22C and 22E), the contrast in contact resonance frequency between the two materials is mostly associated with the difference in the adhesive properties of the materials.

Although the Si is covered by a thin native oxide layer (1 nm to 2 nm), a contrast in the adhesive properties of the Si and SiO$_2$ regions can be still observed. At larger applied forces, in the 100 nN to 200 nN range (FIGS. 22E to 22F), the contact resonance frequency became more and more sensitive to the stiffness of the materials probed and not much contrast was resolved at these forces as the stiffness response mainly comes from the top oxide layers, on both Si and SiO$_2$ regions. However, at even higher applied forces, 200 nN to 250 nN (FIGS. 22I to 22L), the stress field underneath the tip is extended deeper and the contact stiffness is enhanced in the Si region compared with the SiO$_2$ region. Through continuous tracking of the contact resonance frequency during intermittent force-controlled contact (here PFT oscillations), the surface and subsurface mechanical response of a material was retrieved as a function of the applied force (or equivalent as a function of sensing depth of penetration). The measurements provided nanoscale details of the adhesive response and shallow subsurface stiffness response of the materials.

Figure 23A:
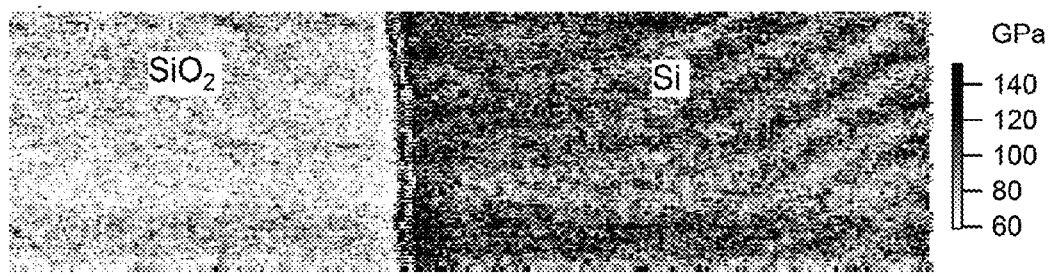
FIG. 23A shows a map of indentation modulus for the sample shown in FIG. 15A.
Figure 23B:
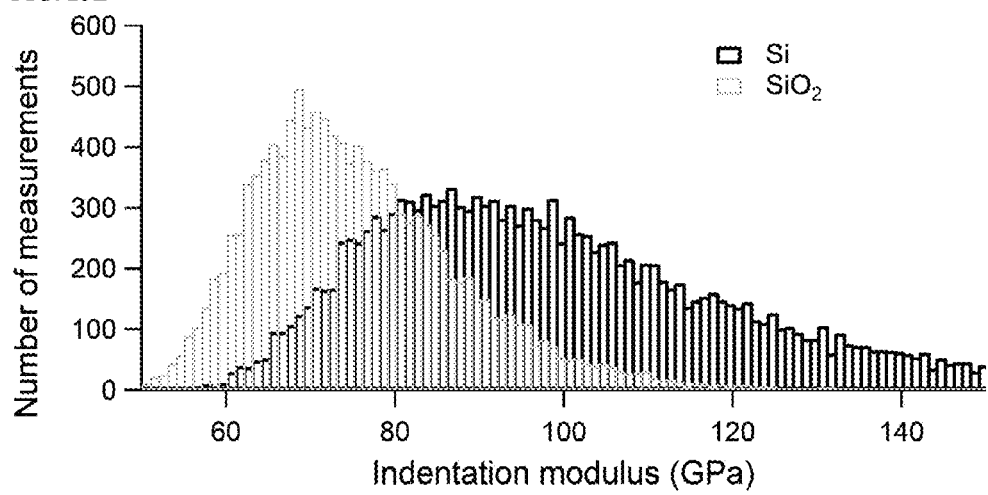
FIG. 23B shows a graph of number of measurements versus indentation modulus for the sample shown in FIG. 15A.
Figure 23C:
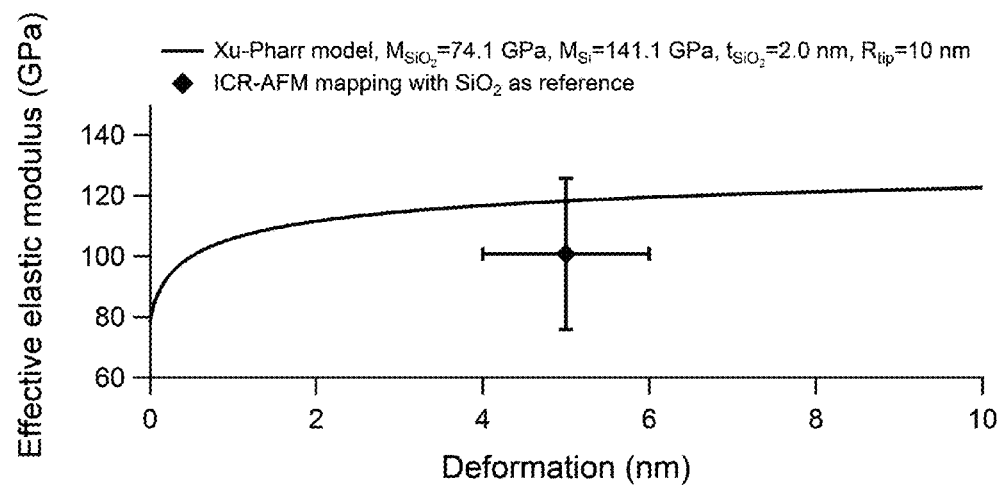
FIG. 23C shows a graph of effective elastic modulus versus deformation for the sample shown in FIG. 15A.

The contact resonance frequency map was converted into indentation a modulus map by using the spring-coupled-clamped cantilever model and considering the SiO$_2$ as a reference material with an indentation modulus of 74.1 GPa. The calculated modulus map is shown in FIG. 23A and its histogram in FIG. 23B. The determined indentation modulus over the Si region can be considered here as an effective modulus of the oxide coated Si. The depth dependence of this effective elastic modulus of the indented Si was calculated with the Xu and Pharr model for indented coated substrates; a native oxide layer of about 2 nm was considered on top of Si. The results are shown in FIG. 23C along with the measured indentation modulus over the Si region at an indentation depth of 5±1 nm (roughly the deformation measured by PFT).

Example 4

Dual Modulation Atomic Force Microscopy on a High Aspect Ratio Sample

Figure 24A:
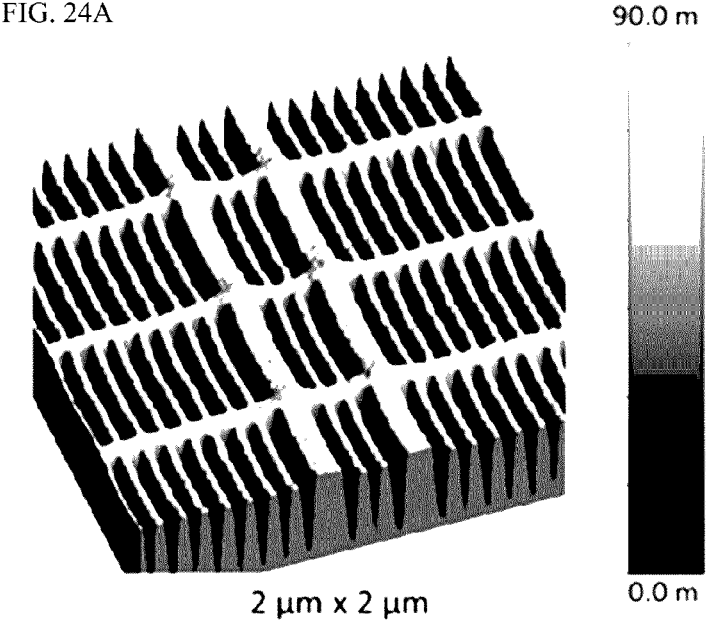
FIG. 24A shows a three-dimensional topographic view of a sample according to Example 3.
Figure 24B:
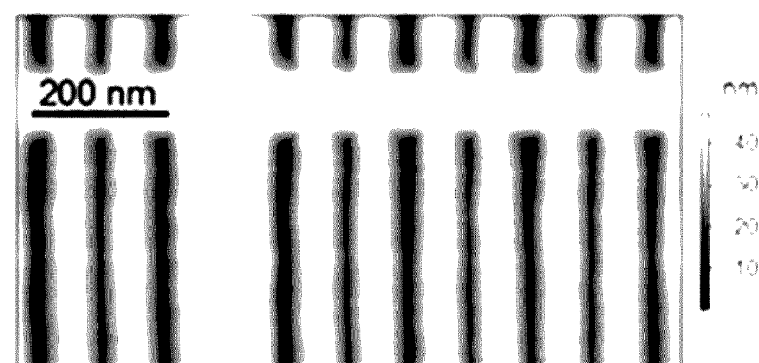
FIG. 24B shows a two-dimensional topographic view of the sample according to Example 3.
Figure 24C:
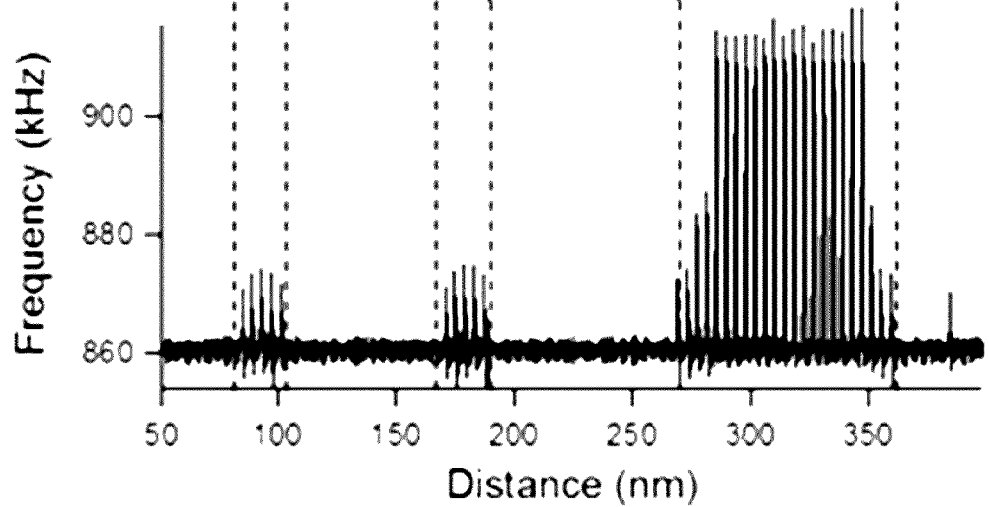
FIG. 24C shows a graph of frequency versus distance for the sample according to Example 3.

The dual modulation microscope described in Example 1 was used with the following features. The sample shown in FIG. 24A had rectangular fins at 90 nm pitch, either 90 nm or 25 nm wide, and 100 nm tall. Such delicate structures are hard to be imaged by AFM in contact mode and are inaccessible for conventional contact resonance-AFM measurements. However, with the dual modulation ICR-AFM operated in peak-force tapping (PFT), the fins were non-destructively scanned, both in terms of surface topography (FIG. 24B) and contact resonance mapping (FIG. 24C).

For ICR-AFM measurements, the AFM cantilever was a PPP-SEIH probe (commercially available from Nanosensors) with the first two free eigenmode frequencies at $f_1$=116.5 kHz and $f_2$=722.6 kHz, and a spring constant of $k_C$=8.2±0.5 N/m. Scanning was performed at 1 μm/s speed with the PFT modulation (using a Bruker AFM) in the form of a sinusoidal oscillation at 0.25 kHz and 15 nm amplitude. The PLL (commercially available as Nanonis from Specs) was used in the constant excitation-mode with 20 mV drive amplitude, integral gain of 10 μs, and a locked-frequency window of 78.1 kHz. The tracked contact resonance frequency was that of the second eigenmode as shown in FIG. 24C, and the PLL detection was adjusted for tracking the change in this resonance frequency only over the top part of the fins where the tip-sample contact is better defined. As a result of the topography-contact resonance frequency correlation provided by ICR-AFM, edge effects on the tip-sample contact stiffness were observed. As shown in FIGS. 25A and 25B, changes in the resonance frequency during tapping were measured in stable scanning conditions, and the piezo signal (PFT modulation) and cantilever deflection (with feedback control on the maximum applied force) did not exhibit perturbations over either the narrow or wide lines of the fins. Particularly, FIGS. 25A and 25B respectively show piezo, cantilever deflection, and contact resonance frequency signals acquired during ICR-AFM scanning over a narrow fin (FIG. 25A) and middle portion of a wide fin (FIG. 25B).

Based on known space location (x, y, and z positions), the ICR-AFM measurements were assembled in a 3D volume of data, with tomographic sections along each spatial direction. As shown in FIGS. 26A, 26B, 26C, and 26D, tomographic sections along a scan line (FIG. 26A) are shown in terms of contact resonance frequency versus applied force on both approach (FIG. 26B) and retract (FIG. 26C) parts. Such maps can be directly converted into contact stiffness versus depth maps. From the approach map (FIG. 26B), CR frequency increased with the increase of the applied force and showed edge effect at the edge of the wide fins and over the narrow fins. The reverse dependence, a decrease in the contact resonance frequency with the decrease in the applied force was observed in the retract map shown in FIG. 26C. From the comparison of the approach and retract maps (FIGS. 26B and 26C), a contact adhesion hysteresis was analyzed from the change in contact resonance frequency at the formation and breaking of contacts across the scanned surface of the sample. From these maps, the contact resonance frequency along the scan line was determined at arbitrary applied forces. An exemplary determination is shown in FIG. 26D for an applied force close to a maximum applied force.

Figure 27:
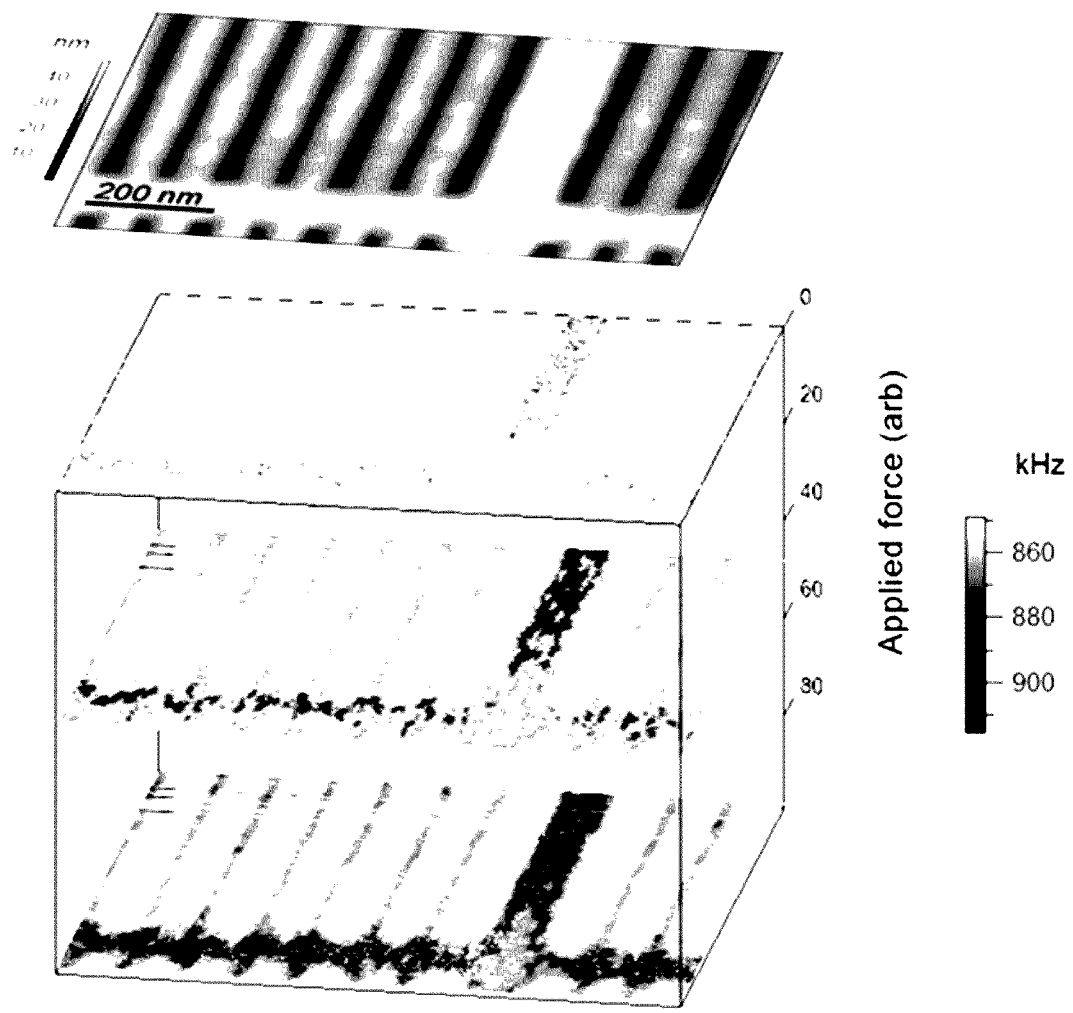
FIG. 27 shows tomographic sections of the sample according to Example 3.

Another visualization three-dimensional data obtained from ICR-AFM measurements is for constant-force maps for a variation of the contact resonance frequency across the sample that was scanned at various applied forces. Such x-,y-tomographic sections are shown in FIG. 27. The maps show correlation with the topography of the sample (shown on top of the contact resonance frequency maps), and local variations in stiffness was assessed along the mapped areas. These variations in stiffness and elastic modulus of the sample were resolved in a lateral and vertical direction with respect to a surface of the sample. The 3D volume of contact resonance frequency acquired by ICR-AFM was used to determine the lateral and vertical (sub-surface) variations in the elastic modulus of the sample. The lateral spatial resolution was determined by the spatial resolution of the PFT scanning (4 nm). The depth sensitivity varied with the contact stress during measurements, which was controlled by the applied force on each material such that deeper sensing was provided at a higher load.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An intermittent contact resonance atomic force microscope comprising:
    a cantilever configured to receive a contact resonance modulation comprising a contact resonance frequency;
    a sample disposed proximate to the cantilever;
    a contact resonance modulator in communication with the cantilever and configured to provide the contact resonance modulation to the cantilever; and
    a scan modulator in communication with the sample to provide a scan modulation to the sample, the scan modulation comprising a scan modulation frequency,
    wherein the contact resonance frequency is independent from the scan modulation frequency.

2. The intermittent contact resonance atomic force microscope of claim 1, further comprising a detector to detect a deflection of the cantilever.

3. The intermittent contact resonance atomic force microscope of claim 1, further comprising a phase sensitive detector to provide a lock frequency to the contact resonance modulator.

4. The intermittent contact resonance atomic force microscope of claim 3, wherein the phase sensitive detector comprises a phase-locked loop (PLL) detector.

5. The intermittent contact resonance atomic force microscope of claim 1, wherein the contact resonance modulator comprises a mechanical transducer.

6. The intermittent contact resonance atomic force microscope of claim 5, wherein the mechanical transducer comprises a piezoelectric transducer.

7. The intermittent contact resonance atomic force microscope of claim 1, wherein the contact resonance modulator comprises an optical transducer.

8. The intermittent contact resonance atomic force microscope of claim 7, wherein the optical transducer comprises a laser.

9. The intermittent contact resonance atomic force microscope of claim 1, wherein the contact resonance modulator comprises a magnetic transducer.

10. The intermittent contact resonance atomic force microscope of claim 9, wherein the magnetic transducer comprises a magnet to provide a magnetic field to the cantilever.

11. The intermittent contact resonance atomic force microscope of claim 1, wherein the contact resonance frequency is greater than the scan modulation frequency.

12. The intermittent contact resonance atomic force microscope of claim 11, wherein the scan modulator provides displacement of the sample in a substantially similar direction as a displacement of the cantilever provided by the contact resonance modulator, and
    the intermittent contact resonance atomic force microscope is configured to displace the sample in a two-dimensional plane that is substantially perpendicular to the contact resonance modulation of the cantilever.

13. The intermittent contact resonance atomic force microscope of claim 12, wherein the scan modulator provides intermittent contact between the cantilever and the sample at the scan modulation frequency, and
    an amplitude of displacement of the cantilever at the contact resonance frequency is less than an amplitude of displacement of the sample at the scan modulation frequency.

14. The intermittent contact resonance atomic force microscope of claim 13, wherein the contact resonance frequency comprises an eigenmode of the cantilever.

15. The intermittent contact resonance atomic force microscope of claim 1, wherein the intermittent contact resonance atomic force microscope provides a stiffness map of the sample, a surface topography of the sample, or a combination comprising at least one of the foregoing.

16. The intermittent contact resonance atomic force microscope of claim 15, wherein the intermittent contact resonance atomic force microscope provides a three-dimensional stiffness of the sample.

17. The intermittent contact resonance atomic force microscope of claim 1, wherein the intermittent contact resonance atomic force microscope provides a surface topography based on intermittent contact between the cantilever and a plurality of spots on the sample, and
    the contact resonance frequency is greater than or equal to 10 kilohertz.

18. A process for performing intermittent contact resonance atomic force microscopy, the process comprising:
    providing an intermittent contact resonance atomic force microscope comprising:
        a cantilever configured to receive a contact resonance modulation;
        a sample disposed proximate to the cantilever;
        a contact resonance modulator in communication with the cantilever and configured to provide the contact resonance modulation to the cantilever; and
        a scan modulator in communication with the sample to provide a scan modulation to the sample;
    subjecting the cantilever to the contact resonance modulation;
    modulating the cantilever at a contact resonance frequency;
    subjecting the sample to the scan modulation; and
    modulating the sample at a scan modulation frequency to perform intermittent contact resonance atomic force microscopy of the sample,
    wherein the contact resonance frequency is independent from the scan modulation frequency.

19. The intermittent contact resonance atomic force microscope of claim 18, further comprising detecting a deflection of the cantilever; and
    producing a feedback frequency based on the deflection of the cantilever.

20. The intermittent contact resonance atomic force microscope of claim 19, further comprising:
    receiving, by a phase sensitive detector, the feedback frequency; and
    providing a lock frequency to the contact resonance modulator from the phase sensitive detector, the deflection of the cantilever being phase locked to the lock frequency.

21. The intermittent contact resonance atomic force microscope of claim 20, further comprising:
    receiving, by a sample controller, the feedback frequency; and
    producing, by the sample controller, the scan modulation frequency; and
    providing the scan modulation frequency to the scan modulator from the sample controller.

* * * * *